United States Patent
Eriksson

(10) Patent No.: US 12,026,767 B2
(45) Date of Patent: *Jul. 2, 2024

(54) PURCHASE MANAGEMENT SYSTEM AND METHOD

(71) Applicant: EASI B2B AB, Stockholm (SE)

(72) Inventor: Patric Eriksson, Stockholm (SE)

(73) Assignee: EASI B2B AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/368,148

(22) Filed: Sep. 14, 2023

(65) Prior Publication Data

US 2024/0005385 A1 Jan. 4, 2024

Related U.S. Application Data

(63) Continuation-in-part of application No. 17/536,393, filed on Nov. 29, 2021, now Pat. No. 11,922,488.
(Continued)

(30) Foreign Application Priority Data

Dec. 7, 2018 (SE) .................................. 1830356-0

(51) Int. Cl.
*G06Q 30/06* (2023.01)
*G06Q 20/38* (2012.01)
(Continued)

(52) U.S. Cl.
CPC ..... *G06Q 30/0637* (2013.01); *G06Q 20/3821* (2013.01); *G06Q 20/405* (2013.01); *G06Q 20/4093* (2013.01)

(58) Field of Classification Search
None
See application file for complete search history.

(56) References Cited

U.S. PATENT DOCUMENTS

| 7,319,986 B2 | 1/2008 | Praisner et al. |
| 8,301,502 B2 | 10/2012 | Livnat |

(Continued)

FOREIGN PATENT DOCUMENTS

| EP | 3147853 A1 | 3/2017 |
| WO | 02/54361 A1 | 7/2002 |

(Continued)

OTHER PUBLICATIONS

Deverse, S., and Maus, S., "Improving Directional Survey Accuracy through Real-Time Operating Centers," [Abstract only], IADC/SPE Asia Pacific Drilling Technology Conference (Singapore, Aug. 22-24, 2016) Proceedings. (Year: 2016).*

(Continued)

*Primary Examiner* — Nicholas D Rosen
(74) *Attorney, Agent, or Firm* — Faegre Drinker Biddle & Reath LLP

(57) ABSTRACT

A purchase management system 100 comprises a central database arrangement 110 and a purchasing authorization database module 130, arranged to communicate with a transaction authorization module 405. The central database arrangement 110: receives, from a purchasing entity 200, purchasing rules applying to a purchasing group 250; adds a selected purchasing group 250 as metadata linked to a first transaction ID; adds the purchasing rules applying to said purchasing group 250; and transfers the metadata to the purchasing authorization database module 130. The purchasing authorization database module 130 receives a purchase approval request from the transaction authorization module 405; decides on the purchase approval request based on whether the requested purchase fulfils the purchasing rules; responds to the transaction authorization module 405 with approval or rejection of the purchase approval request; and transfers the transaction information to the central (Continued)

| Merchant-Dev-ID | Card Number | Amount | Currency | CVV | TRK2 | ExpDate | Time Stamp |
|---|---|---|---|---|---|---|---|
| 051-348-368539 | 1234567812345678 | 300 | SEK | 425 | xxxx | 05/20 | 201811301026 | database arrangement 110. The central database arrangement 110 transfers the transaction information to the purchasing entity 200, thereby allowing the information about the purchase to be automatically entered into administrative systems of the purchasing entity 200.

23 Claims, 11 Drawing Sheets

Related U.S. Application Data which is a continuation of application No. 17/217,658, filed on Mar. 30, 2021, now Pat. No. 11,216,864, which is a continuation of application No. PCT/SE2019/051246, filed on Dec. 6, 2019.

(51) Int. Cl.
*G06Q 20/40* (2012.01)
*G06Q 30/0601* (2023.01)

(56) References Cited

U.S. PATENT DOCUMENTS

| | | | |
|---|---|---|---|
| 8,788,945 | B1 | 7/2014 | Jesensky et al. |
| 9,122,948 | B1* | 9/2015 | Zhu .................... G07C 9/00563 |
| 9,685,024 | B2 | 6/2017 | Kemper et al. |
| 10,002,348 | B1 | 6/2018 | Doctor et al. |
| 10,395,248 | B1 | 8/2019 | Agarwal et al. |
| 10,395,264 | B2 | 8/2019 | Fordyce et al. |
| 10,504,120 | B2 | 12/2019 | Yue et al. |
| 10,607,206 | B2 | 3/2020 | Wetzel et al. |
| 10,757,462 | B2* | 8/2020 | Lykes ................ H04N 21/2668 |
| 11,151,634 | B2* | 10/2021 | Varma .................. G06Q 20/102 |
| 11,171,911 | B2* | 11/2021 | Schnitt .................. G06Q 20/12 |
| 11,216,864 | B2 | 1/2022 | Eriksson |
| 2002/0099648 | A1 | 7/2002 | Devoe et al. |
| 2002/0174030 | A1 | 11/2002 | Praisner et al. |
| 2003/0212595 | A1 | 11/2003 | Antonucci |
| 2006/0106700 | A1 | 5/2006 | Boren et al. |
| 2008/0265018 | A1 | 10/2008 | Kemper et al. |
| 2009/0006203 | A1 | 1/2009 | Fordyce et al. |
| 2009/0228368 | A1 | 9/2009 | Brown |
| 2010/0153224 | A1 | 6/2010 | Livnat |
| 2010/0228672 | A1 | 9/2010 | Karim |
| 2015/0178725 | A1 | 6/2015 | Poetsch |
| 2015/0278813 | A1 | 10/2015 | Yue et al. |
| 2016/0300419 | A1* | 10/2016 | Breedvelt-Schouten .................... G06F 16/9038 |
| 2019/0057371 | A1 | 2/2019 | Wetzel et al. |
| 2019/0141006 | A1* | 5/2019 | Schnitt .................. G06Q 20/02 |
| 2019/0188718 | A1 | 6/2019 | Atkins |
| 2020/0082459 | A1* | 3/2020 | Varma .................. G06F 3/04817 |
| 2020/0204847 | A1* | 6/2020 | Lykes ................ H04N 21/8455 |
| 2021/0233156 | A1 | 7/2021 | Eriksson |
| 2022/0084106 | A1 | 3/2022 | Eriksson |

FOREIGN PATENT DOCUMENTS

| | | |
|---|---|---|
| WO | 2011/008953 A2 | 1/2011 |
| WO | 2015/031386 A1 | 3/2015 |

OTHER PUBLICATIONS

Charest, T., "Elan Financial Services Introduces New Tool to Help Financial Institutions Minimize Fraud Losses," Business Wire, Mar. 13, 2013. (Year: 2013).

International Preliminary Report on Patentability received for PCT Patent Application No. PCT/SE2019/051246, mailed on Mar. 17, 2021, 9 pages.

International Search Report and Written Opinion received for PCT Patent Application No. PCT/SE2019/051246, mailed on Feb. 24, 2020, 14 pages.

* cited by examiner

| Merchant-Dev-ID | Card Number | Amount | Currency | CVV | TRK2 | ExpDate | Time Stamp |
|---|---|---|---|---|---|---|---|
| 051-348-368539 | 1234567812345678 | 300 | SEK | 425 | xxxx | 05/20 | 201811301026 |

Figure 7

PURCHASE MANAGEMENT SYSTEM AND METHOD

CROSS-REFERENCE TO RELATED APPLICATIONS

This application is a continuation-in-part application of prior U.S. patent application Ser. No. 17/536,393, filed Nov. 29, 2021, which is a continuation application of U.S. patent application Ser. No. 17/217,658, filed Mar. 30, 2023, now U.S. Pat. No. 11,216,864, issued Jan. 4, 2022, which is a continuation of International Application No. PCT/SE2019/051246, filed Dec. 6, 2019, which claims benefit of Swedish Patent Application No. 1830356-0, filed Dec. 7, 2018, all of which are herein incorporated by reference in their entirety.

TECHNICAL FIELD

The present disclosure relates generally to purchase management systems and methods.

BACKGROUND

U.S. Pat. No. 7,319,986 describes a dynamic payment card management system in which card control settings can be dynamically modified, so that approval parameters can be dynamically managed through the application of configurable company purchasing policies and rules.

The system described in U.S. Pat. No. 7,319,986 revolves around the use of purchase requests. No purchase may be made without a specific purchase request, although the purchase request may in some situations be synthesized by the system. The use of purchase requests simplifies the approval process within the company.

Problems with the Prior Art

In the system described in U.S. Pat. No. 7,319,986, the customer may be notified that a transaction has occurred, but since the system revolves around the use of purchase requests, there is no way to at the time of purchase transfer the details of the purchase into the economy system of the company. Thus, the company does not receive the details of the purchase until they receive the invoice from the supplier.

Further, the system described in U.S. Pat. No. 7,319,986 is a whole card processing system, that is intended to replace the existing payment infrastructure.

There is thus a need for an improved purchase management system.

SUMMARY

A purchase management system that revolves around the use of purchase requests simplifies the approval process within the company, but since the purchase request is managed internally within the company, external parties are not able to add information, such as e.g. details about a completed purchase, to it.

According to the invention, a database that is accessible by any party to the system is instead used for storing the information regarding the purchase. The database arrangement preferably comprises functionality to "translate" the data format used by the different parties to the system into one single data format, since this makes it easier for the different parties to add information regarding the purchase.

The present disclosure relates to purchase management systems and purchase management methods in which purchasing entities may purchase goods and services from suppliers/merchants. Prior art systems do not enable the transaction information from such purchases to be automatically entered into economy systems and other administrative systems of the purchasing entity. The invention achieves this by collecting information from various parties to the system in a way that prior art systems are not able to do.

The claimed purchase management system comprises a central database arrangement, a customer interface to the central database arrangement comprising data fields for linking metadata to transaction IDs, and a purchasing authorization database module, arranged to communicate with a transaction authorization module. The central database arrangement may be arranged to receive, from a purchasing entity through the customer interface, purchasing rules applying to a purchasing group. The central database arrangement may comprise central processing means arranged to: add a selected purchasing group as metadata linked to a first transaction ID in one or more first data fields in the central database arrangement; add the purchasing rules applying to said purchasing group as metadata linked to the first transaction ID in one or more second data fields in the central database arrangement; and transfer metadata linked to the first transaction ID from the data fields to the purchasing authorization database module. The purchasing authorization database module may be arranged to receive a purchase approval request from the transaction authorization module, which purchase approval request has been generated in the transaction authorization module based on information received via a payment card network, and comprises transaction information, comprising at least the purchase amount, linked to the first transaction ID. The purchasing authorization database module may comprise authorization processing means arranged to: decide on the purchase approval request by approving or rejecting the purchase approval request based on whether the requested purchase fulfils the purchasing rules linked to the first transaction ID in the purchasing authorization database module; respond to the transaction authorization module with the approval or rejection of the purchase approval request; add the transaction information received from the transaction authorization module as metadata linked to the first transaction ID in the purchasing authorization database module; and transfer the transaction information linked to the first transaction ID to the central database arrangement. The central processing means of the central database arrangement may be further arranged to transfer the transaction information linked to the first transaction ID to the purchasing entity, thereby allowing the information about the purchase to be automatically entered into at least one administrative system of the purchasing entity. This enables a simplified collection of transaction information from purchases, and a conversion of this transaction information into a data format used by the purchasing entity, so that the transaction information may be automatically entered into economy systems and other administrative systems of the purchasing entity.

The claimed purchase management system may alternatively comprise a central database arrangement arranged to communicate with a transaction authorization module, and a customer interface to the central database arrangement comprising data fields for linking metadata to transaction IDs. The central database arrangement may be arranged to receive, from a purchasing entity through the customer interface, purchasing rules applying to a purchasing group. The central database arrangement may be arranged to comprise central processing means arranged to: add a selected purchasing group as metadata linked to the first transaction ID in one or more first data fields in the central database arrangement; and add the purchasing rules applying to said purchasing group as metadata linked to the first transaction ID in one or more second data fields in the central database arrangement. The central database arrangement may be arranged to receive a purchase approval request from the transaction authorization module, which purchase approval request has been generated in the transaction authorization module based on information received via a payment card network, and comprises transaction information, comprising at least the purchase amount, linked to the first transaction ID. The central database arrangement preferably comprises authorization processing means arranged to: decide on the purchase approval request by approving or rejecting the purchase approval request based on whether the requested purchase fulfils the purchasing rules linked to the first transaction ID in the central database arrangement; respond to the transaction authorization module with the approval or rejection of the purchase approval request; and add the transaction information received from the transaction authorization module as metadata linked to the first transaction ID in the central database arrangement. The central processing means of the central database arrangement may further be arranged to transfer the transaction information linked to the first transaction ID to the purchasing entity, thereby allowing the information about the purchase to be automatically entered into at least one administrative system of the purchasing entity. This enables a simplified collection of transaction information from purchases, and a conversion of this transaction information into a data format used by the purchasing entity, so that the transaction information may be automatically entered into economy systems and other administrative systems of the purchasing entity.

The claimed purchase management method comprises: inputting, through a customer interface to a central database arrangement comprising data fields for linking metadata to transaction IDs, purchasing rules applying to a purchasing group; adding a selected purchasing group as metadata linked to a first transaction ID in one or more first data fields in the central database arrangement; adding the purchasing rules applying to said purchasing group as metadata linked to the first transaction ID in one or more second data fields in the central database arrangement; transferring metadata linked to the first transaction ID from the data fields in the central database arrangement to a purchasing authorization database module; receiving, in a transaction authorization module, a first transaction authorization request linked to the first transaction ID, the first transaction authorization request comprising transaction authorization information; communicating a purchase approval request from the transaction authorization module to the purchasing authorization database module, which purchase approval request has been generated in the transaction authorization module based on information received via a payment card network, and comprises transaction information, comprising at least the purchase amount; deciding on the purchase approval request by approving or rejecting the purchase approval request based on whether the requested purchase fulfils the purchasing rules linked to the first transaction ID in the purchasing authorization database module; responding to the transaction authorization module with the approval or rejection of the purchase approval request; responding, from the transaction authorization module, to the first transaction authorization request linked to the first transaction ID; adding the transaction information received from the transaction authorization module as metadata linked to the first transaction ID in the purchasing authorization database module; transferring the transaction information linked to the first transaction ID to the central database arrangement; and transferring the transaction information linked to the first transaction ID to the purchasing entity, thereby allowing the information about the purchase to be automatically entered into at least one administrative system of the purchasing entity. This enables a simplified collection of transaction information from purchases, and a conversion of this transaction information into a data format used by the purchasing entity, so that the transaction information may be automatically entered into economy systems and other administrative systems of the purchasing entity.

According to the invention, the payment card number identifies the payment service provider, and also identifies to the payment card network and/or the payment service provider that the payment card is a part of the purchase management system. It is therefore the payment card number that automatically triggers the generation of the purchase approval request, and thereby allows a "hardblock" of the purchase directly at the time of purchase based on purchasing rules defined by the purchasing entity.

In embodiments, the purchasing authorization database module is arranged within the bank, as a bank specific database module. The definition "within the bank" means that the modules within the bank are located within the systems of the bank, behind the firewall of the bank, so that the information transferred between the modules is never sent outside the firewall of the bank. This enables quick response times for the purchase approval request, and also allows the type of transaction information that it for regulatory reasons is not allowed to send outside the firewall of the bank to be added as metadata linked to the first transaction ID in the purchasing authorization database module. There are sometimes strict regulatory requirements on the transaction information that it is allowed to receive from the outside and/or send outside of the bank, but by arranging the purchasing authorization database module within the bank, also transaction information that it is not allowed to receive from the outside and/or send outside of the bank may be entered into the purchasing authorization database module. However, the purchasing authorization database module may also be arranged separate from the bank, especially if the transaction information is encrypted.

The purchasing authorization database module does not have to be operated by an actual bank—it may be operated by any type of payment service provider (such as e.g. Apple, Google, Klarna, PayPal, Amazon or Alibaba) or transaction provider (such as e.g. FIS Global or Nexi).

In embodiments, the transaction authorization module is operated by a payment provider operating the payment card network (such as e.g. MasterCard, VISA or American Express), and thus arranged within the payment card network. Since the payment provider operates the payment card network, the payment provider has access to all the transaction information that is transferred within the payment card network. If the transaction authorization module is operated by a payment provider operating a payment card network, the checks that are typically made by the payment provider (regarding e.g. card data, limits and behavior) may be performed in the transaction authorization module, without even contacting the cardholder bank (i.e. the bank that holds the account).

In embodiments, the purchasing authorization module is also operated by the payment provider, possibly together with the provider of the central database arrangement. However, the purchasing authorization module may alternatively be operated by a third party, and communicate directly with the transaction authorization module in the payment card network. In either case, the purchasing authorization based on the purchasing rules may if desirable be performed between the transaction authorization module and the purchasing authorization module, without even contacting the cardholder bank. In this case, the cardholder bank is not contacted until all checks except the final check against the account balance have been performed. However, it is also possible to perform the check against the account balance at the cardholder bank before performing the purchasing authorization based on the purchasing rules in the purchasing authorization module.

In embodiments, the data fields in the central database arrangement are configurable, and the central database arrangement is arranged to receive, from the purchasing entity, a configuration of a data format for the metadata for each data field defined for the purchasing group.

In embodiments, the purchasing group comprises at least one purchasing individual. This enables purchasing rules to be defined for and adapted to one or more specific purchasing individuals, or for subsections of the purchasing entity comprising one or more purchasing individuals.

In embodiments, the purchasing group comprises the whole purchasing entity. This enables the purchasing entity to define general purchasing rules for the whole entity.

In embodiments, the purchasing rules are general purchasing rules for a subsection of the purchasing entity, and the adding of the purchasing rules applying to the purchasing group as metadata linked to the first transaction ID in the central database arrangement involves determining to which subsection the purchasing group belongs.

In embodiments, the transaction information comprises merchant information, e.g. the name of the merchant or a code for identifying the merchant category and/or the merchant, and the deciding on the purchase approval request by approving or rejecting it is further based on the merchant information. This enables the purchasing entity to block purchases from selected suppliers/merchants and/or merchant categories and/or only allow purchases from selected suppliers/merchants and/or merchant categories. The purchasing entity may also block purchases in a certain city, region, country, currency or similar, and/or only allow purchases in a certain city, region, country, currency or similar.

In embodiments, a large supplier/merchant which supplies a number of different categories of products uploads the article numbers for their products into the central database arrangement, and the purchasing entity indicates which products are allowed for purchase by the purchasing group. At a time of purchase, the supplier/merchant communicates directly with the central database arrangement and/or the purchasing authorization database module to check whether the products currently up for purchase are allowed for purchase according to the purchasing rules for the purchasing group. This check is in addition to the purchase approval request, and allows the purchasing rules to comprise also rules regarding which categories of product that are allowed for purchase.

In embodiments, the purchasing rules specify that certain metadata must have been added linked to the transaction ID in the central database arrangement before a purchase is made, and the deciding on the purchase approval request comprises rejecting the purchase approval request if this metadata is not present linked to the transaction ID in the purchasing authorization database module.

In embodiments, information is transferred from the central database arrangement to a payment card issuing entity, either directly or via a payment card administration module within the cardholder bank, so that the payment card issuing entity may issue payment cards to the purchasing entity.

In embodiments, the central database arrangement and the purchasing authorization database module are synchronized to be mirrored versions of each other. However, the mirroring does not necessarily comprise all the information in the database—some metadata fields may be excluded from the mirroring.

In embodiments, the central database arrangement is arranged to communicate with a number of different parties, and comprises adapters that convert the data format used by each of these different parties into one single data format, preferably a data format defined by the purchasing entity.

The term "payment card" in this application covers all payment means that are used for payments via a payment card network such as e.g. MasterCard, VISA or American Express. This includes physical payment cards, electronic payment cards, virtual payment cards, smartphones or other devices also when used for payment services such as e.g. Apple Pay, Google Pay, Samsung Pay, including using e.g. QR, EAN or PIN codes.

The term "bank" in this application refers to any payment service provider or financial institution that is authorized to approve and effect payment card payments or similar types of transactions, and thus not only to payment service providers or financial institutions that are formally defined and authorized as banks. In some jurisdictions, a payment service provider or financial institution must fulfil certain regulatory requirements in order to be covered by e.g. deposit insurance systems, and in those jurisdictions, the term "bank" may be reserved for payment service providers or financial institutions fulfilling such regulatory requirements. The term "bank" in this application is not limited in this way, but covers any payment service provider or financial institution that is authorized to approve and effect payment card payments or similar types of transactions. The term "bank" in this application may thus also cover payment networks such as e.g. MasterCard, VISA or American Express that approve and effect transactions. The term "bank" in this application also covers co-operations between payment networks such as e.g. MasterCard, VISA or American Express and payment service providers or financial institutions that are authorized to approve and effect payment card payments or similar types of transactions.

The central processing means of the central database arrangement may be one central processing arrangement, or a number of central processing arrangements between which signals are transmitted. Some processing may e.g. take place in one central processing arrangement, and signals may then be transmitted to one or more other central processing arrangements for further processing.

The authorization processing means of the purchasing authorization database module may be any processing arrangement or processing arrangements within the system, and are thus not necessarily processing means that are specific to the purchasing authorization database module.

The modules may be physically separate modules between which information is sent, but may also be virtual modules implemented on the same server, or simply software modules.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 7 is an example of transaction authorization information.

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1A:
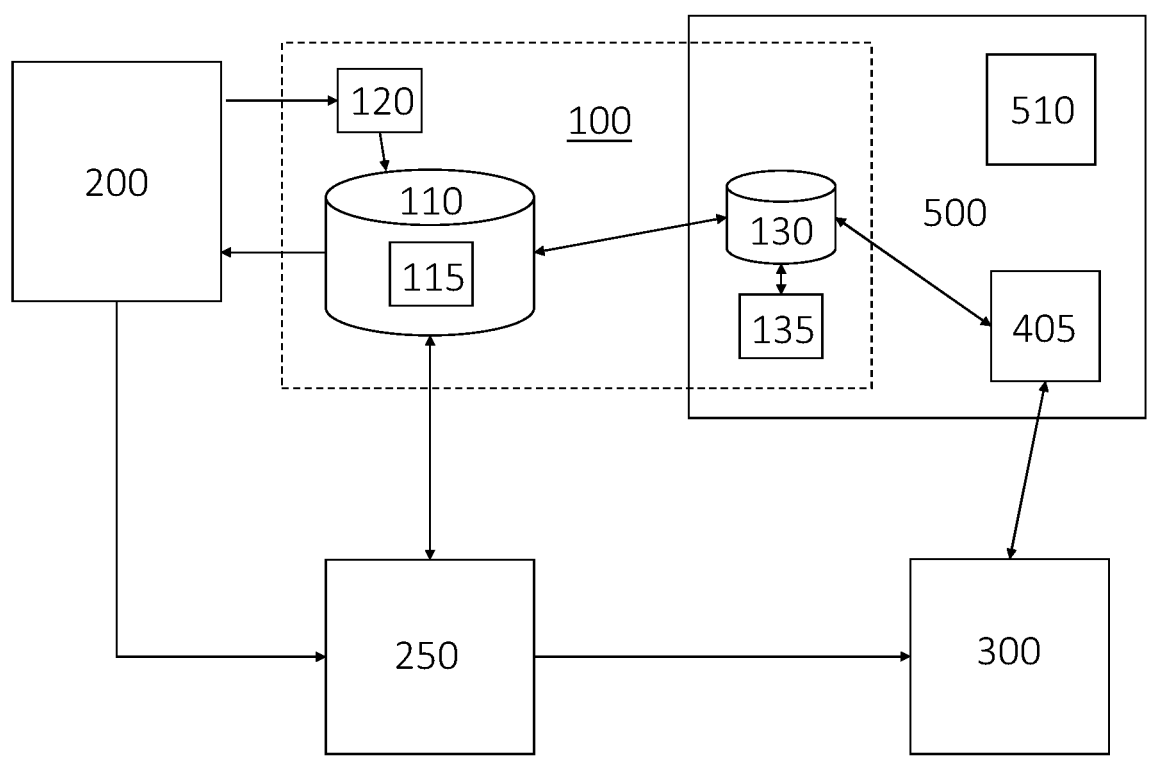
FIGS. 1a, 1b, 2a, 2b, 3a, and 3b schematically illustrate purchase management systems in accordance with embodiments described herein.

There are a number of different types of payment card processing models. The simplest model, where a merchant issues a payment card and has a direct relationship with the cardholder, may be defined as a two corner model. In a two corner model, the cardholder can only use the payment card at the issuing merchant.

If the merchant does not wish to issue and handle the payment card, a three corner model may be used, where a third party acts as an intermediate between the cardholder and the merchant. In a three corner model, the cardholder can still only use the payment card at the specified merchant.

In order to provide cardholders with more flexibility, a four corner model is instead normally used for payment cards. In such a model, a cardholder may use a payment card for payments to any merchant that accepts the card, and the transaction is handled between the merchant bank and the cardholder bank via a payment card network such as e.g. MasterCard, VISA or American Express. The payment card has a payment card number, which (in the case of physical payment cards) is typically hardwired into the chip and/or the magstripe of the payment card.

The term "payment card" in this application covers all payment means that are used for payments via a payment card network such as e.g. MasterCard, VISA or American Express. This includes physical payment cards, electronic payment cards, virtual payment cards, smartphones or other devices also when used for payment services such as e.g. Apple Pay, Google Pay, Samsung Pay, including using e.g. QR, EAN or PIN codes.

When the payment card is used for payment, transaction authorization is achieved by the merchant bank sending a transaction authorization request to the cardholder bank via the payment card network. Such a transaction authorization request may e.g. comprise the transaction authorization information shown in FIG. 7. The cardholder bank then typically performs a number of checks, regarding e.g. card data, account balance, limits and behavior, and approves or declines the transaction.

According to the present invention, a purchase approval request is added to the transaction authorization process, in addition to the general transaction authorization. The purchase approval is effected at the same time as the general transaction authorization takes place. The merchant bank does not have to be involved in, or even informed about, the fact that a purchase approval takes place in addition to the general transaction authorization. If the purchase is not approved, the merchant bank receives the information that the transaction is not authorized, but not necessarily whether this is due to the checks regarding e.g. card data, account balance, limits and behavior, or whether this is due to the requested purchase not fulfilling the purchasing rules.

According to the present invention, there is thus no need for suppliers/merchants to be configured in the purchase management system before purchases are made, and suppliers/merchants do not have to be in any way linked to any purchase management system. The present invention enables information about the purchase to be transferred to the purchasing entity even if the suppliers/merchants are not in any way linked to the purchase management system, and this is not possible with any prior art systems.

This enables a simplified collection of transaction information from purchases, and a conversion of this transaction information into a data format used by the purchasing entity 200, so that the transaction information may be automatically entered into economy systems and other administrative systems of the purchasing entity 200. The payment card number (which in the case of physical payment cards is typically hardwired into the chip and/or the magstripe on the payment card) identifies the payment service provider, and also identifies to the payment card network and/or the payment service provider that the payment card is a part of the purchase management system 100. It is therefore the payment card number that automatically triggers the generation of the purchase approval request, and thereby allows a "hardblock" of the purchase directly at the time of purchase based on purchasing rules defined by the purchasing entity 200.

The present disclosure relates to purchase management systems and purchase management methods. Embodiments of the disclosed solution are presented in more detail in connection with the figures.

FIGS. 1a-3b schematically illustrate different embodiments of purchase management systems 100.

The purchase management system 100 schematically illustrated in FIG. 1a comprises a central database arrangement 110 (which may e.g. be a cloud service), a customer interface 120 to the central database arrangement 110, and a purchasing authorization database module 130, arranged to communicate with a transaction authorization module 405 within a cardholder bank 500. The purchasing authorization database module 130 may be arranged within the cardholder bank 500, as a bank specific database module 130, to enable quick response times for the purchase approval request, and also allow the type of transaction information that it for regulatory reasons is not allowed to send outside the firewall of the bank to be added as metadata linked to the first transaction ID in the purchasing authorization database module 130. There are sometimes strict regulatory requirements on the transaction information that it is allowed to receive from the outside and/or send outside of the bank, but by arranging the purchasing authorization database module 130 within the bank, as a bank specific database module 130, also transaction information that it is not allowed to receive from the outside and/or send outside of the bank may be entered into the purchasing authorization database module 130.

Figure 1B:
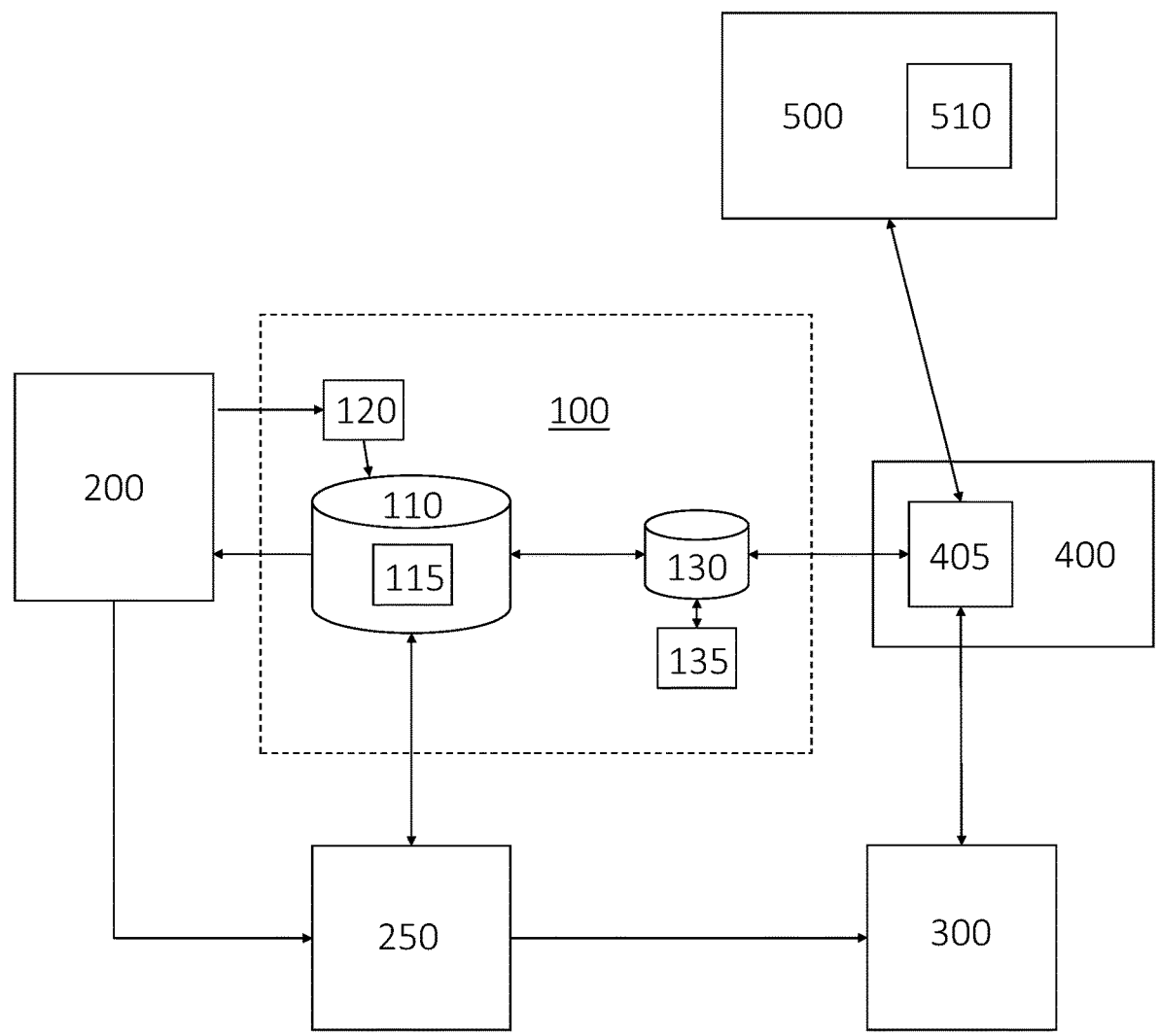

In the purchase management system 100 schematically illustrated in FIG. 1b, the purchasing authorization database module 130 is instead arranged to communicate with a transaction authorization module 405 which is operated by a payment provider 400 operating a payment card network, such as e.g. MasterCard, VISA or American Express, and thus arranged within the payment card network. Since the payment provider 400 operates the payment card network, the payment provider 400 has access to all the transaction information that is transferred within the payment card network. If the transaction authorization module 405 is operated by a payment provider 400 operating a payment card network, the checks that are typically made by the payment provider 400 (regarding e.g. card data, limits and behavior) may be performed in the transaction authorization module 405, without even contacting the cardholder bank 500 (i.e. the bank that holds the account).

In embodiments of the purchase management system 100 schematically illustrated in FIG. 1b, the purchasing authorization module 130 is also operated by the payment provider 400, possibly together with the provider of the central database arrangement 110. However, the purchasing authorization module 130 may be operated by a third party, and communicate directly with the transaction authorization module 405 in the payment card network. In either case, the purchasing authorization based on the purchasing rules may if desirable be performed between the transaction authorization module 405 and the purchasing authorization module 130, without even contacting the cardholder bank 500. In this case, the cardholder bank 500 is not contacted until all checks except the final check against the account balance have been performed. However, it is also possible to perform the check against the account balance at the cardholder bank 500 before performing the purchasing authorization based on the purchasing rules in the purchasing authorization module 130.

The central database arrangement 110 preferably comprises data fields that allow metadata to be linked to the transaction IDs. These data fields may be configurable and dynamic, and the central database arrangement 110 may be arranged to receive, from the purchasing entity 200, a configuration of a data format for the metadata for each data field defined for a purchasing group 250.

In all embodiments of the purchase management system 100, the central database arrangement 110 may be arranged to receive purchasing rules from a purchasing entity 200 through the customer interface 120. These purchasing rules may be general purchasing rules for the whole purchasing entity 200, but they may also be purchasing rules that are specific to a certain subsection of the purchasing entity 200, or even specific to a purchasing individual. The customer interface 120 may e.g. be a web interface or a mobile application.

Central processing means 115 of the central database arrangement 110 may create transaction IDs to be used in transactions. These transaction IDs may be created one at a time, or they may be created in a batch, and they may be created based on predefined rules, or upon request from the purchasing entity 200. Transaction IDs may even be created before any purchasing rules are defined. Transaction IDs may require activation before use.

For each transaction ID, information regarding the intended purchaser may be added as metadata in one or more data fields in the central database arrangement 110. The intended purchaser may e.g. be defined as any purchasing individual within a purchasing group 250. The purchasing group 250 may comprise one or more specific purchasing individuals, but may also be defined as e.g. a subsection of the purchasing entity 200, or the whole purchasing entity 200. All purchasing individuals in a purchasing group 250 do not have to be employed by the purchasing entity 200—a purchasing group 250 may e.g. comprise consultants or subcontractors to the purchasing entity 200.

Based on the metadata regarding the purchasing group 250, the central processing means 115 of the central database arrangement 110 may identify which purchasing rules apply to this particular transaction ID, and add these purchasing rules as metadata linked to the transaction ID in one or more data fields in the central database arrangement 110. The purchasing rules are always the same for all purchasing individuals within a purchasing group 250, but purchasing groups 250 may be dynamically modified if the need arises for different purchasing rules for different purchasing individuals within a purchasing group. In such a case, a new purchasing group 250 is simply formed for the purchasing individuals needing different purchasing rules.

Figure 2A:
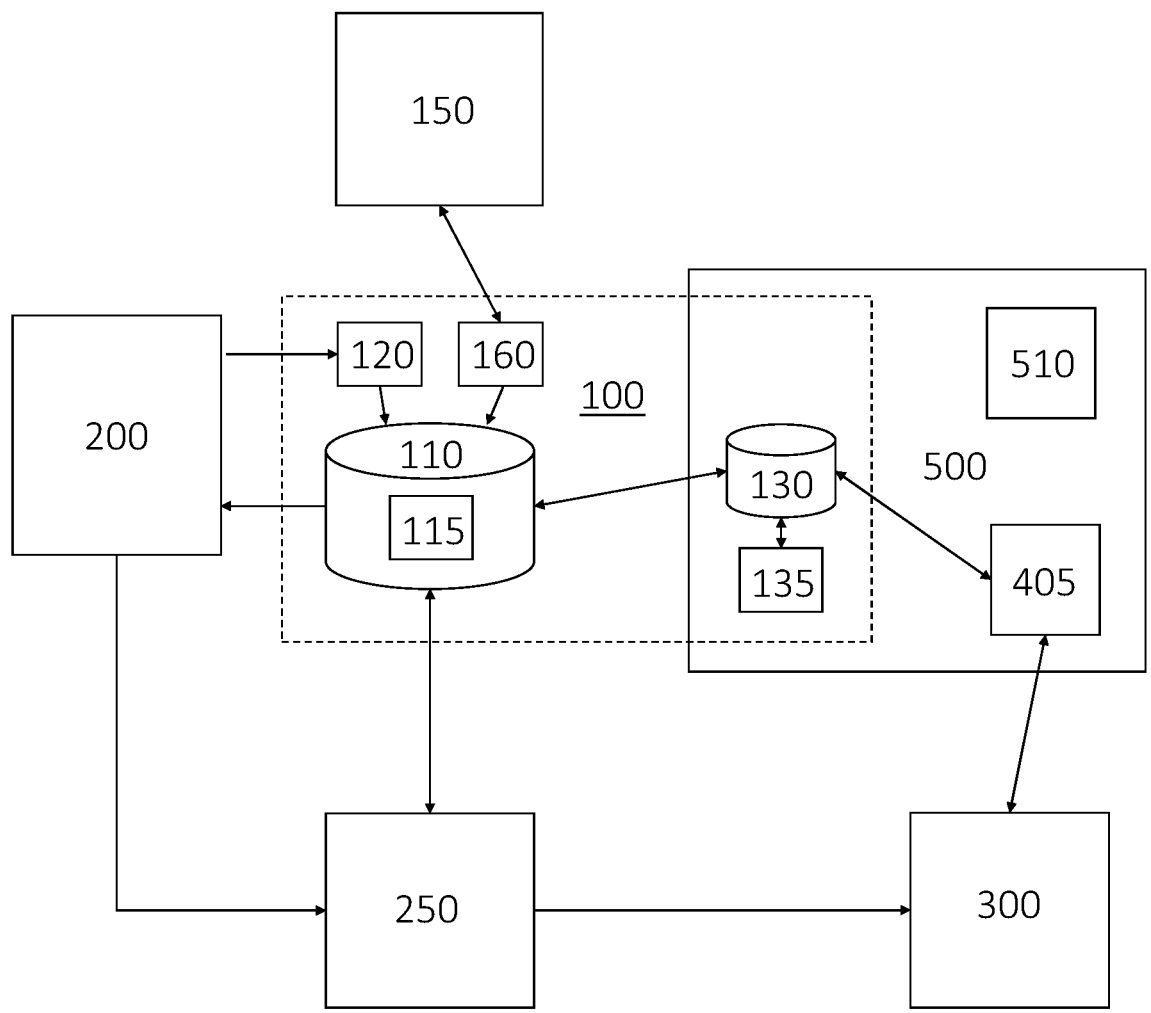
Figure 2B:
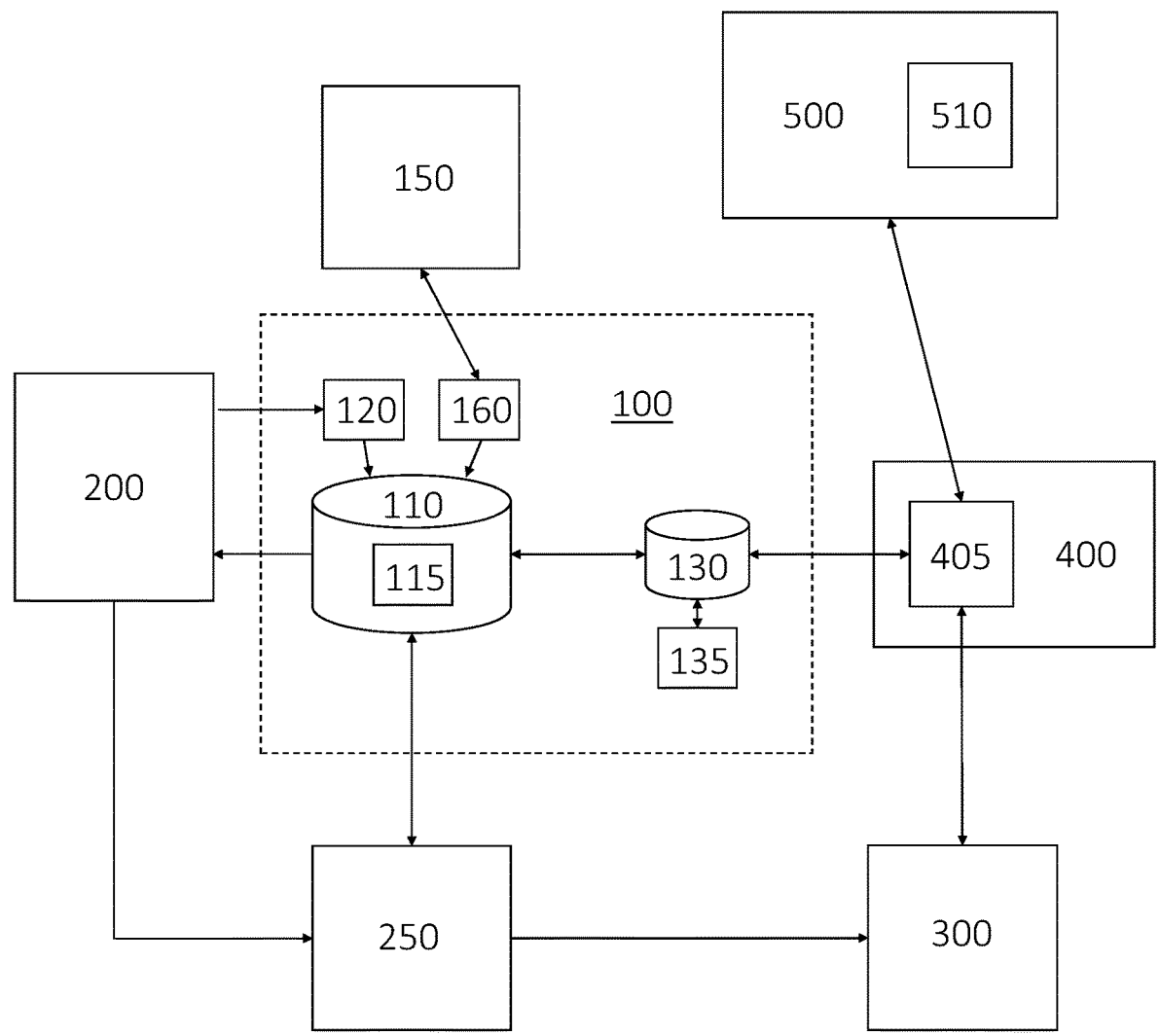

Other types of information relating to the transaction may also be added as metadata linked to the transaction ID in one or more data fields in the central database arrangement 110. Other entities than the purchasing entity 200 may also have access to the central database arrangement 110 and be able to add metadata linked to the transaction ID. The adding of metadata to the central database arrangement 110 by third party entities 150, who preferably use a specific third party interface 160, is illustrated in FIGS. 2a-b. The third party interface 160 may e.g. be a web interface or a mobile application.

Such a third party entity 150 may e.g. be a client of the purchasing entity 200, for the benefit of whom the purchasing entity 200 makes a purchase for further invoicing to the client. In such a case, the metadata may e.g. be an approval to bear the cost of the purchase. It is then advantageous if all the information needed for invoicing the client is added as metadata linked to the transaction ID, so that the invoicing of the client may be simplified, or even automated.

Another example of such a third party entity 150 may be an organization providing information about blacklisted suppliers or suppliers not meeting certain regulatory requirements. If such an organization adds this information as metadata to all transaction IDs, the purchasing rules may define that purchases will never be allowed from a supplier/merchant defined by this metadata.

A further example of such a third party entity 150 is the merchant/supplier 300. If the merchant/supplier 300 has access to the central database arrangement 110 and is able to add metadata linked to the transaction ID, the merchant/supplier 300 may e.g. add an electronic receipt as metadata linked to the transaction ID. The merchant/supplier 300 may use the third party interface 160, or a specific interface for merchants/suppliers 300. Such an interface may e.g. be a web interface or a mobile application. An electronic receipt may however also be added by another party, such as e.g. by a purchasing individual within a purchasing group 250, if the merchant/supplier 300 does not have access to the central database arrangement 110.

Purchasing individuals within purchasing groups 250 may also be able to communicate with the central database arrangement 110, in order to retrieve information and/or add metadata. If e.g. the purchasing entity 200 wishes to enable company payment cards to be used for private purchases, there may be an option for the purchasing individual to tag a purchase as private, and e.g. have the cost automatically deducted from the next salary. Purchasing individuals within purchasing groups 250 may use the third party interface 160, or a specific interface for purchasing groups 250. Such an interface may e.g. be a web interface or a mobile application.

The purchasing rules may e.g. require the purchasing individual to add certain metadata to the transaction ID, either before or after the purchase, in order to simplify administration within the purchasing entity 200. The purchasing individual may e.g. be required to add account, cost center, project, or object as metadata linked to the transaction ID. Further requirements may then apply to specific types of purchases, based on the metadata added by the purchasing individual. If the purchase e.g. relates to representation, such as a restaurant visit with a client, the purchasing individual may be required to add the names of the people present as metadata linked to the transaction ID. If the purchase relates to business travel, the purchasing individual may be required to specify the destination and/or the purpose of the trip. This enables automatic accounting of invoices within the purchasing entity 200. The purchasing rules may require that this metadata has been added for the purchase to be approved. If the purchasing rules require that this metadata has been added, the purchasing individual may be warned that the purchase will be rejected if this metadata is not added, even before the purchasing individual attempts to make the purchase. Such a warning is in this case preferably communicated to the purchasing individual, via e.g. SMS, email, or a mobile application.

Certain items of information are however impossible to add before the purchase has been approved. The purchasing individual may e.g. be required to add the receipt as metadata linked to the transaction ID, e.g. by photographing the receipt using a mobile application. In such situations, the purchase has already taken place and can thus not be rejected, but future purchases for this purchasing individual may be blocked until the required metadata has been added to all previous transactions. This blocking may be done manually by the purchasing entity 200. However, the purchasing rules may specify e.g. that after a certain time or a certain number of purchases where this has not been done, all further purchases are automatically blocked.

The purchasing rules may also, for certain suppliers/merchants, specify in which way purchases may be made. They may e.g. for cost reasons specify that only web based purchases are allowed from a certain supplier, and in this case, an attempt to make a purchase in a physical shop will be rejected. Information about the reason for the rejection is in this case preferably communicated to the purchasing individual, via e.g. SMS, email, or a mobile application.

The metadata linked to the transaction ID may be transferred to the purchasing authorization database module 130. It is not necessary to transfer all the metadata to the purchasing authorization database module 130, as long as the purchasing rules and all metadata that apply to them are transferred. However, in an embodiment, all the information in the central database arrangement 110 is mirrored into the purchasing authorization database module 130.

When the purchasing authorization database module 130 has received the metadata linked to the transaction ID, a purchase approval request may be sent from the transaction authorization module 405. The purchase approval request comprises transaction information, which is typically the same as the transaction authorization information that, when the payment card is used for payment, is sent via the payment card network from the merchant bank to the cardholder bank 500 and received in the transaction authorization module 405. An example of such transaction authorization information is shown in FIG. 7. The transaction information in the purchase approval request does not necessarily have to comprise all of the transaction authorization information, as long as it comprises the amount, together with enough information to link it to the desired transaction ID. If the purchase approval request does not comprise the transaction ID, it therefore needs to comprise some other item of transaction information that enables the purchasing authorization database module 130 to link the purchase to a transaction ID, such as e.g. transaction information identifying the purchasing group 250. If the purchasing group 250 is assigned one or more specific payment cards, this transaction information may e.g. be the payment card number or a token for the payment card number. Authorization processing means 135 of the purchasing authorization database module 130 may then simply assign the purchase to the next available transaction ID for this purchasing group 250.

The authorization processing means 135 of the purchasing authorization database module 130 then reviews whether the requested purchase fulfils the purchasing rules linked to the transaction ID, i.e. the purchasing rules applying to the purchasing group 250. In addition to the examples given above, the purchasing rules may e.g. relate to maximum amount for each purchase, maximum aggregated amount, adherence to budget, or restrictions on where or when purchases may be made (international purchases or purchases on weekends may e.g. be blocked). If the purchase approval request comprises merchant information such as e.g. the name of the merchant or a code for identifying the merchant category and/or the merchant, the purchasing rules may also relate to specific merchants that are allowed or blocked for the purchasing group 250. This enables the purchasing entity 200 to block purchases from selected suppliers/merchants and/or merchant categories and/or only allow purchases from selected suppliers/merchants and/or merchant categories. The purchasing entity 200 may e.g. use this functionality to block purchases from liquor stores such as Systembolaget, or to only allow purchases from specific food chains such as ICA and/or Coop or from specific types of merchants such as food stores.

A large supplier/merchant which supplies a number of different categories of products, such as e.g. Walmart or IKEA, may be a party to the purchase management system 100 and communicate directly with the central database arrangement 110 and/or the purchasing authorization database module 130. This allows the purchasing rules to comprise also rules regarding which categories of product (or individual products) that are allowed for purchase. In embodiments, the supplier/merchant may upload the article numbers for their products into the central database arrangement 100, so that the purchasing entity 200 may indicate which products are allowed for purchase by a certain purchasing group 250. At a time of purchase, the supplier/merchant may in this case communicate directly with the central database arrangement 110 and/or the purchasing authorization database module 130 to check whether the products currently up for purchase are allowed for purchase according to the purchasing rules for the purchasing group 250. If the purchasing rules for the purchasing group 250 does not allow the purchase of the product in question, the supplier/merchant will not allow the purchase to be made. This check is in addition to the purchase approval request described above.

The authorization processing means 135 of the purchasing authorization database module 130 thus approves or rejects the purchase approval request based on whether the requested purchase fulfils the purchasing rules linked to the transaction ID in the purchasing authorization database module 130. The authorization processing means 135 of the purchasing authorization database module 130 also adds the transaction information received from the transaction authorization module 405 as metadata linked to the transaction ID in the purchasing authorization database module 130, and transfers this transaction information to the central database arrangement 110, where it is also added as metadata linked to the transaction ID. This may take place either before or after the approval/rejection is sent to the transaction authorization module 405.

The transaction information is preferably "translated" or converted by functionality in the central database arrangement 110 into another data format, preferably a data format defined by the purchasing entity 200. This is further explained below, with reference to FIG. 6.

Based on the approval/rejection received from the authorization processing means 135 of the purchasing authorization database module 130, together with the general transaction authorization performed by checking e.g. card data, account balance, limits and behavior, the transaction authorization module 405 approves or declines the transaction. If the authorization processing means 135 of the purchasing authorization database module 130 has rejected the transaction, the transaction authorization module 405 will decline the transaction even if the general transaction authorization checks show that it would be allowable. Likewise, if the general transaction authorization checks show that the transaction would not be allowable, the transaction authorization module 405 will decline the transaction even if the authorization processing means 135 of the purchasing authorization database module 130 approves the purchase. In such situations, the transaction authorization module 405 may not even send a purchase approval request to the purchasing authorization database module 130, since the transaction will anyhow be declined.

If the general transaction authorization is performed in the transaction authorization module 405 before a purchase approval request is sent to the purchasing authorization database module 130, the authorization processing means 135 of the purchasing authorization database module 130 may be able to determine whether the transaction authorization module 405 will approve or decline the transaction when the authorization processing means 135 of the purchasing authorization database module 130 has decided on whether to approve or reject the purchase approval request. Alternatively, the transaction authorization module 405 may transfer this information to the purchasing authorization database module 130. Information regarding whether the transaction has been approved or declined by the transaction authorization module 405 may be added as metadata linked to the transaction ID in the purchasing authorization database module 130.

Other types of information may also be added as metadata linked to the transaction ID in the purchasing authorization database module 130. The cardholder bank 500 and/or the transaction authorization module 405 may e.g. provide the purchasing authorization database module 130 with information about suspected fraud, transaction status, or other similar types of information, so that this information may be transferred to the central database arrangement 110.

When the central database arrangement 110 has received the transaction information as metadata linked to the transaction ID, the central processing means 115 of the central database arrangement 110 may transfer the transaction information to the purchasing entity 200, preferably in a data format defined by the purchasing entity 200. This enables the transaction information to be automatically entered into economy systems and/or other administrative systems of the purchasing entity 200. In this way, the purchasing entity may follow-up on all transactions long before any invoices are received from the suppliers/merchants. This enables the purchasing entity 200 to keep track on its budget at all times, and adapt the purchasing rules accordingly.

Purchasing rules may be adapted for various reasons. If a certain subsection of the purchasing entity 200 is considered as one purchasing group 250, but it is desired to adapt the purchasing rules for certain purchasing individuals within this subsection to e.g. add more restrictions (or even block all purchases) for a certain purchasing individual, a new purchasing group 250 may be created for this purchasing individual, with more restricted purchasing rules than for the rest of the subsection. Both the purchasing groups 250 and the purchasing rules my thus be dynamically updated by the purchasing entity 200.

The purchasing entity 200 does not necessarily define actual purchasing groups in the system. Instead, the purchasing entity 200 may e.g. define purchasing rules on a number of hierarchical levels. Some of the rules may be general for the whole organization, while other rules may be specific to some individuals or groups of individuals. In the context of this application, a purchasing group 250 is a group of one or more purchasing individuals to whom the same purchasing rules apply.

The data format of the configurable dynamic data fields in the central database arrangement 110 that allow metadata to be linked to the transaction IDs may in embodiments be configured by the purchasing entity 200, so that the purchasing entity 200 may define the metadata desired and the data format for this metadata. This allows for e.g. metadata regarding cost centers, accounts and other invoicing information to be linked to the transaction IDs in the central database arrangement 110, in the format desired by the purchasing entity 200. This enables the purchasing entity 200 to define the metadata it desires to receive and the format in which it wishes to receive it in an electronic invoice, so as to enable this metadata to be retrieved from the central database arrangement 110 and added to an electronic invoice. Such an electronic invoice may e.g. be sent from the cardholder bank 500, from the central database arrangement 110, or from a third party. If the invoice for the transactions made using the system 100 is an electronic invoice comprising metadata specified by the purchasing entity 200, this enables automated handling of the invoice by the purchasing entity 200, which enables a huge saving in administrative workload.

This configuration of the configurable dynamic data fields may be very specific, with e.g. different configurations of different data fields for different purchasing groups 250, but it may also be very general. A purchasing entity that uses a specific economy or administrative system such as e.g. SAP, Visma, Oracle, or Microsoft Dynamics, may configure the dynamic data fields according to a standard setup for users of this specific economy or administrative system. The configuration of the data format may in this case simply be a designation of the economy or administrative system used.

Figure 3A:
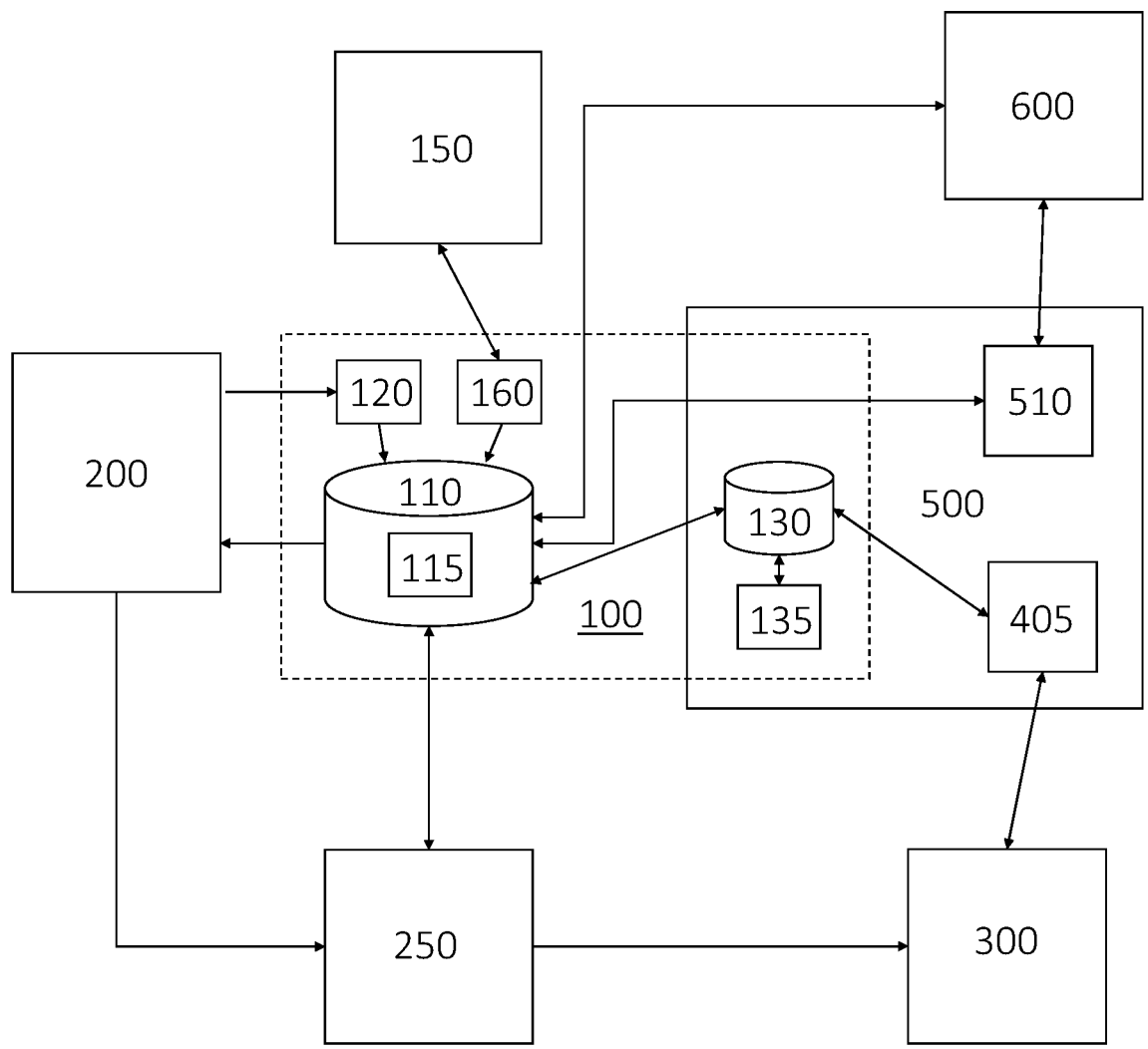
Figure 3B:
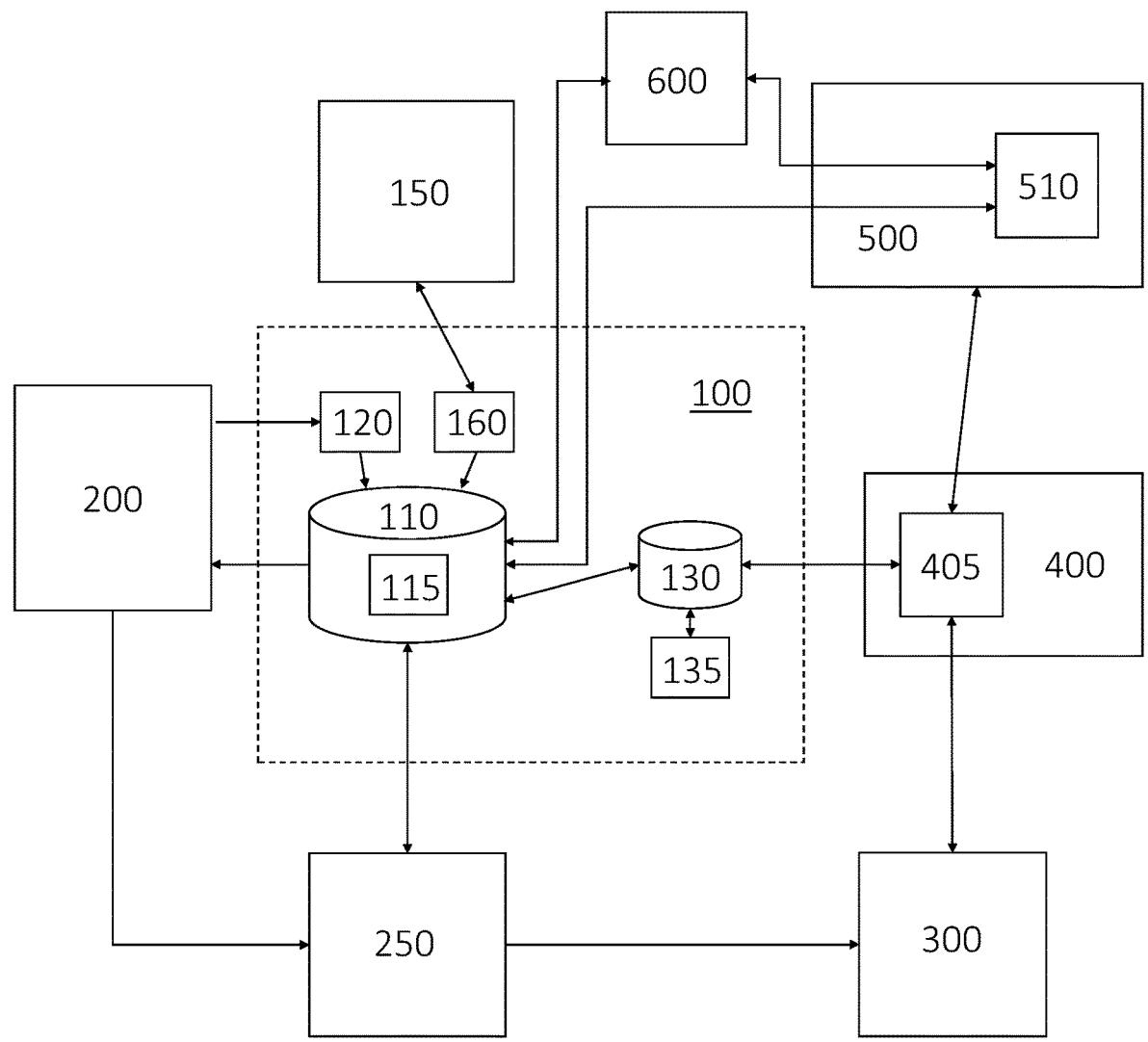

The present invention may e.g. use payment cards to effect the payments. Information about the purchasing individuals may in this case be transferred from the central database arrangement 110 to a payment card issuing entity 600, as illustrated in FIGS. 3a-b. This transfer may take place directly between the central database arrangement 110 and the payment card issuing entity 600, or be effected via a payment card administration module 510, which may be arranged within the cardholder bank 500. The payment card issuing entity 600 may be linked to the cardholder bank 500, but it may also be a separate payment card issuing entity 600.

In order to connect payments made with the payment cards to the purchasing individuals making the purchases, information about the payment cards is preferably transferred from the payment card issuing entity 600 to the central database arrangement 110, either directly or via the payment card administration module 510, which may be arranged within the cardholder bank 500. The information is preferably not actual credit card numbers, since there may be limitations as to whether it is allowed to store this as metadata linked to the transaction IDs in the central database arrangement 110. The information may instead e.g. be tokens for credit card numbers.

Figure 4:
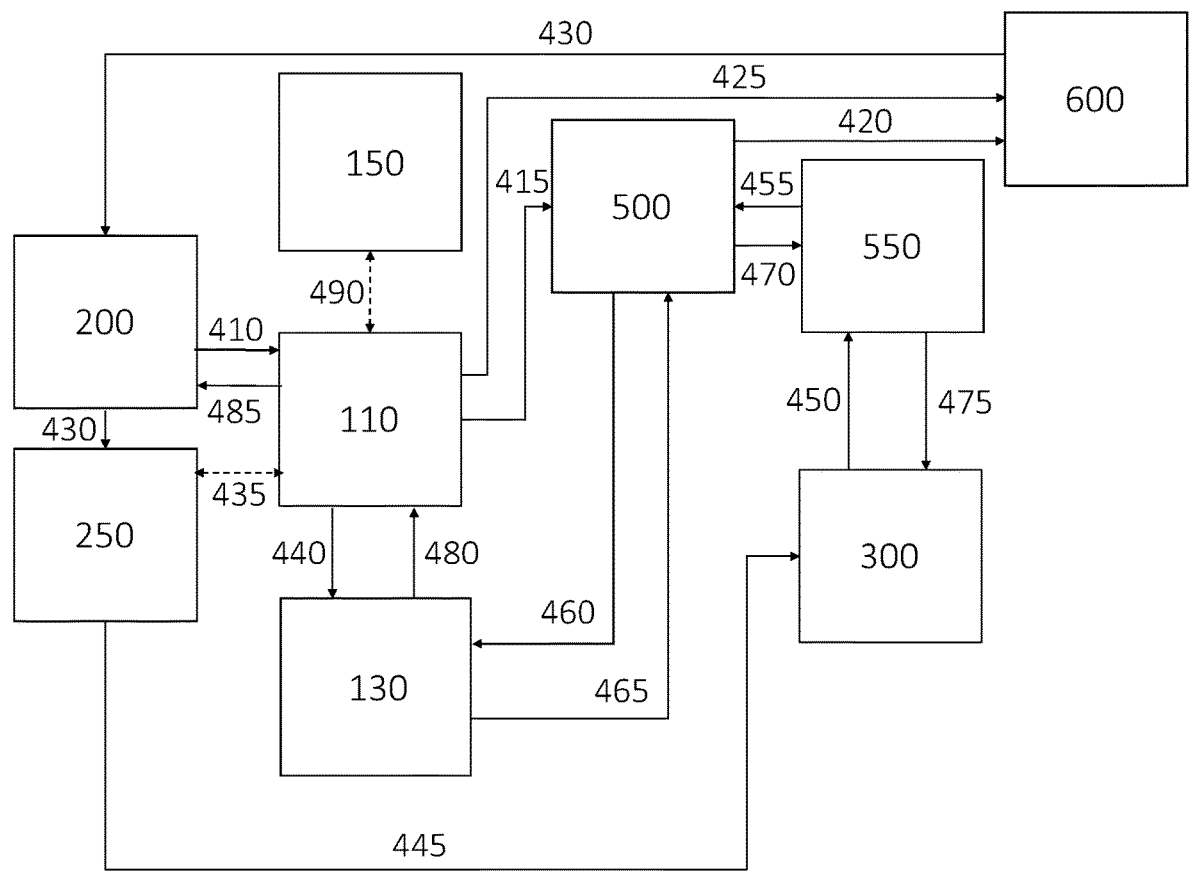
FIGS. 4 and 5 are example flow diagrams of purchase management methods in accordance with embodiments described herein.

FIG. 4 is an example flow diagram of a purchase management method in a purchase management system 100 as described in FIG. 3*a*. The flow is as follows:

Step 410: The purchasing entity 200 configures its purchasing rules, and optionally also the data format for the metadata for each data field defined by the purchasing entity 200, in the central database arrangement 110 (this could take place at any point before step 460, and metadata may be added by the purchasing entity 200 at any point during the flow).

Step 415: The central database arrangement 110 orders card accounts for the purchasing entity 200 from the cardholder bank 500. Alternatively, the purchasing entity already has corporate payment cards with card accounts in the cardholder bank 500, to which the purchase management service can be added as an addon service.

Step 420: The cardholder bank 500 orders payment cards from the payment card issuing entity 600 (at least in the case of physical payment cards). The payment cards may alternatively be ordered by the purchase management service provider. If the purchasing entity already has corporate payment cards, these may instead be configured to interact with the purchase management system 100, as an addon service.

Step 425: Additional information, such as personalization of cards, logos, or the like, may (at least in the case of physical payment cards) be provided to the payment card issuing entity 600 from the central database arrangement 110. Payment cards may also be ordered directly by the payment card issuing entity 600 from the central database arrangement 110.

Step 430: Payment cards may (at least in the case of physical payment cards) be sent from the payment card issuing entity 600 to the purchasing individuals 250 (the distribution may involve the purchasing entity 200).

Step 435 (optional): A purchasing individual 250 adds metadata relating to a purchase via a user interface to the central database arrangement 110 (this could take place at any point during the flow).

Step 440: Transaction IDs and metadata linked to them, such as purchasing rules, are transferred from the central database arrangement 110 to the purchasing authorization database module 130.

Step 445: A purchasing individual makes a purchase from a merchant/supplier 300.

Step 450: The merchant bank 550 receives information about the purchase from the merchant/supplier 300.

Step 455: The merchant bank 550 requests the cardholder bank 500 to authorize the transaction, via e.g. a payment card network operated by a payment provider 400 such as e.g. MasterCard, VISA or American Express.

Step 460: The cardholder bank 500 requests purchase approval from the purchasing authorization database module 130.

Step 465: The purchasing authorization database module 130 sends a purchase approval to the cardholder bank 500.

Step 470: The cardholder bank 500 sends a transaction authorization to the merchant bank 550.

Step 475: The merchant bank 550 sends a transaction allowance to the merchant/supplier 300.

Step 480: The purchasing authorization database module 130 transfers transaction information regarding the approved purchase to the central database arrangement 110 (this could take place at any point after step 460).

Step 485: The central database arrangement 110 transfers the transaction information to the purchasing entity 200.

Step 490 (optional): Third parties add metadata to the transaction (this could take place at any point during the flow).

Figure 5:
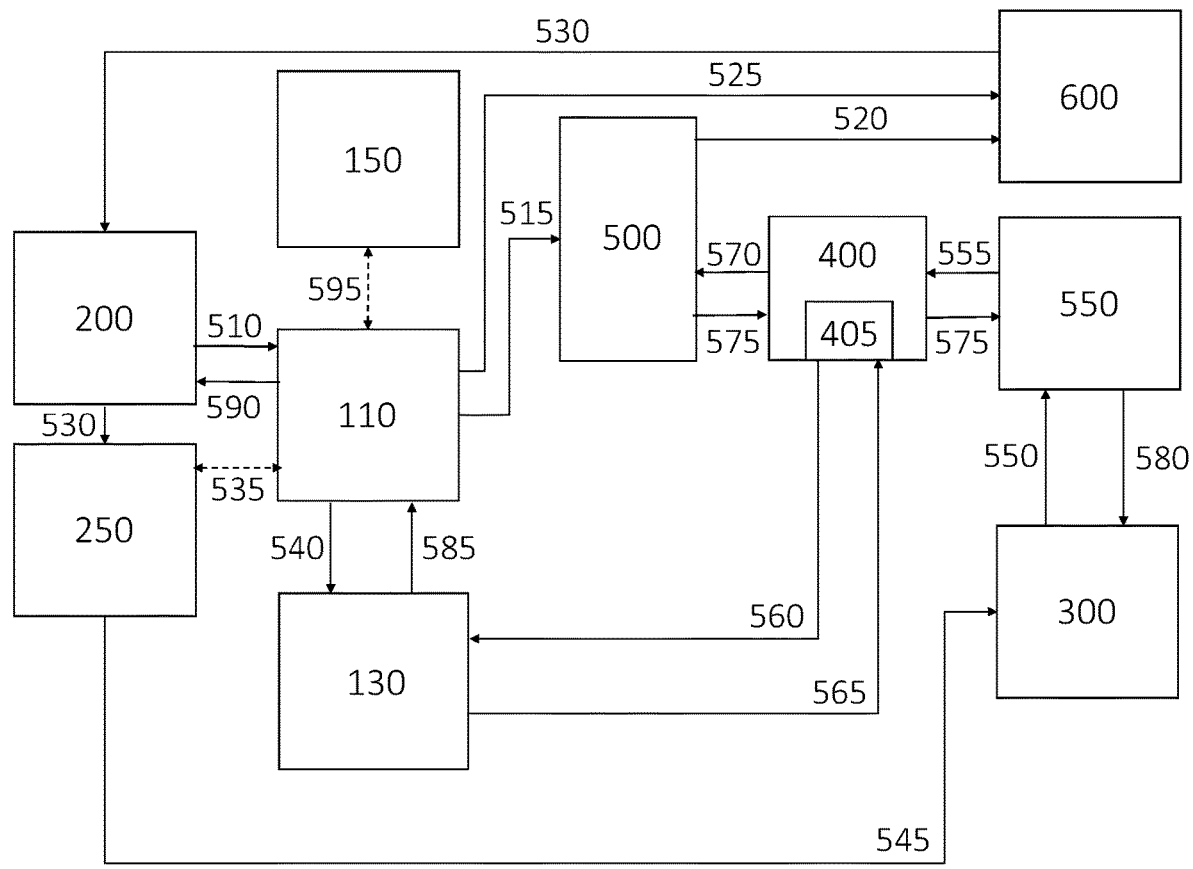

FIG. 5 is an example flow diagram of a purchase management method in a purchase management system 100 as described in FIG. 3*b*. The flow is as follows:

Step 510: The purchasing entity 200 configures its purchasing rules, and optionally also the data format for the metadata for each data field defined by the purchasing entity 200, in the central database arrangement 110 (this could take place at any point before step 560, and metadata may be added by the purchasing entity 200 at any point during the flow).

Step 515: The central database arrangement 110 orders card accounts for the purchasing entity 200 from the cardholder bank 500. Alternatively, the purchasing entity already has corporate payment cards with card accounts in the cardholder bank 500.

Step 520: The cardholder bank 500 orders payment cards from the payment card issuing entity 600 (at least in the case of physical payment cards). If the purchasing entity already has corporate payment cards, these may instead be configured to interact with the purchase management system 100, as an addon service.

Step 525: Additional information, such as personalization of cards, logos, or the like, may (at least in the case of physical payment cards) be provided to the payment card issuing entity 600 from the central database arrangement 110. Payment cards may also be ordered directly by the payment card issuing entity 600 from the central database arrangement 110.

Step 530: Payment cards may (at least in the case of physical payment cards) be sent from the payment card issuing entity 600 to the purchasing individuals 250 (the distribution may involve the purchasing entity 200).

Step 535 (optional): A purchasing individual 250 adds metadata relating to a purchase via a user interface to the central database arrangement 110 (this could take place at any point during the flow).

Step 540: Transaction IDs and metadata linked to them, such as purchasing rules, are transferred from the central database arrangement 110 to the purchasing authorization database module 130.

Step 545: A purchasing individual makes a purchase from a merchant/supplier 300.

Step 550: The merchant bank 550 receives information about the purchase from the merchant/supplier 300.

Step 555: The merchant bank 550 requests the cardholder bank 500 to authorize the transaction, via a payment card network operated by a payment provider 400 (such as e.g. MasterCard, VISA or American Express).

Step 560: The transaction authorization module 405 (which is operated by the payment provider 400, and thus arranged within the payment card network) requests purchase approval from the purchasing authorization database module 130.

Step 565: The purchasing authorization database module 130 sends a purchase approval to the transaction authorization module 405.

Step 570: The transaction authorization module 405 requests transaction authorization from cardholder bank 500 (this may take place before steps 560 and 565).

Step 575: The cardholder bank 500 sends a transaction authorization to the merchant bank 550 (directly or via the transaction authorization module 405).

Step 580: The merchant bank 550 sends a transaction allowance to the merchant/supplier 300.

Step 585: The purchasing authorization database module 130 transfers transaction information regarding the approved purchase to the central database arrangement 110 (this could take place at any point after step 560).

Step 590: The central database arrangement 110 transfers the transaction information to the purchasing entity 200.

Step 595 (optional): Third parties add metadata to the transaction (this could take place at any point during the flow).

Figure 6:
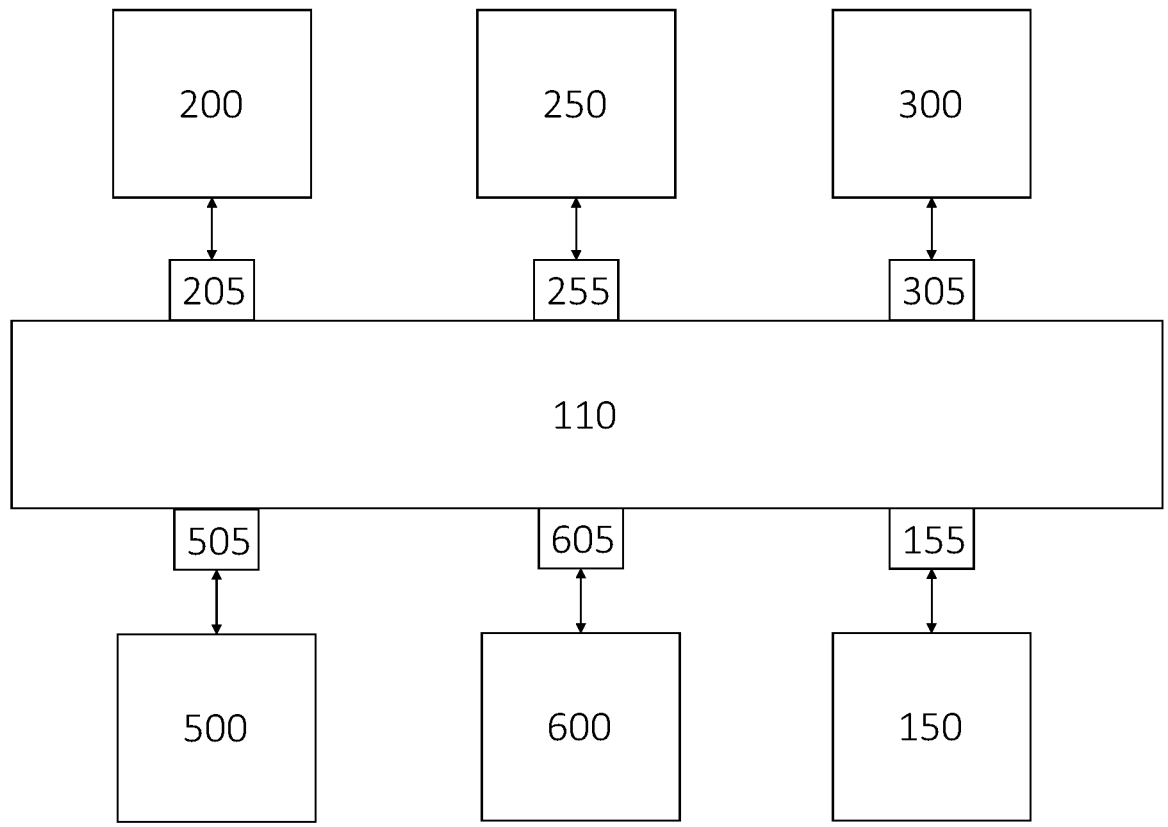
FIG. 6 schematically illustrates a part of a purchase management system, in accordance with one or more embodiments described herein.

FIG. 6 schematically illustrates a part of a purchase management system 100 in accordance with one or more embodiments described herein. The central database arrangement 110 preferably uses a dynamic configuration of the data fields, the "metadata carriers", that allow metadata to be linked to the transaction IDs, so that a purchasing entity 200 may define the metadata desired and the format for this metadata. As explained above in relation to FIGS. 1-3, the central database arrangement 110 may interact and communicate with many different parties, such as e.g. purchasing entities 200, purchasing individuals or purchasing groups 250, merchants/suppliers 300, cardholder banks 500, payment card issuing entities 600, and various other third party entities 150. In order for the central database arrangement 110 to be able to gather data from these parties, and transmit data to and from these parties, the central database arrangement 110 needs to comprise functionality, e.g. in the form of "adapters", to "translate" or convert the data format used by each of these different parties into one single data format, preferably a data format defined by the purchasing entity 200. The central database arrangement 110 needs to comprise a specific adapter 205, 255, 305, 505, 605, 155 for each party 200, 250, 300, 500, 600, 150, since different parties generally use different data formats (if there are several different third parties 150, several different adapters 155 are generally needed). This enables the purchasing entity 200 to define the metadata it desires to receive from the different parties, as well as the data format of this metadata.

Example Embodiment

The following example describes an embodiment of the purchase management system 100 where the purchase management service provider EASI operates the central database arrangement 110, and provides the EASI Purchase Management System (EPMS) to a customer (a purchasing entity 200) in cooperation with a payment service provider that offers EASI Authorization Control (EAC) as an addon to its payment service. The EAC database may be hosted either by the payment service provider (alone or in co-operation with the purchase management service provider EASI), or entirely by the purchase management service provider EASI.

The purchasing entity 200 adds/integrates the EASI service to their economy or administrative system (e.g. SAP, Visma, Oracle, or Microsoft Dynamics). The purchasing entity 200 defines purchasing groups 250 and purchasing rules (i.e. the customer's dynamic framework of rules) in the EPMS, via the customer interface 120 to the central database arrangement 110. The purchasing entity 200 may also provide a configuration of a data format for the dynamic code string for the metadata it wants to import to its systems.

Without the EASI service, a traditional transaction authorization query/request would at the time of a purchase be sent from the acquiring bank over the payment card network to the payment service provider, e.g. the cardholder bank. The query follows defined requirements and protocols, with a technical validation (PAN and expiry, CVV, PIN), a business validation (account and card status, available amount), and a fraud validation (fraud rules), which corresponds to the above described checks regarding e.g. card data, account balance, limits and behavior. The payment service provider responds a yes/no to the question regarding whether there is money for the purchase on the account.

With the EPMS and the EAC addon, the payment service provider triggers a second query to the EAC database in the form of a purchase approval request sent from a transaction authorization module 405, operated by the payment service provider, to the EAC database. This is a type of query that has not previously been performed according to the prior art. The EASI platform runs a purchase authorization control in real time vs. the customer's own dynamically preconfigured framework of rules, and receives a go/no go vs. the customer's own purchasing rules. This is the EASI service that enables customers to run their purchasing rules on an individual level, on each card at every transaction, at the time of purchase.

Through the EASI service, the customer can predefine its code string, the data fields for the metadata, to be posted into the customer's economy or administrative system (e.g. SAP, Visma, Oracle, or Microsoft Dynamics), where the EASI service populates the metadata pre, during and post the actual time of purchase as per the customer requirements. The definitions can be set at any desired level of grouping, i.e. company, unit, group, individual, external, or the like. The EASI service automatically posts the populated metadata as per the customer requirements into the customer's economy or administrative system in real time, matching the desired, needed or required data as per the customer preferences on each transaction. This is the digitized and automatic data enrichment provided by the innovation.

Through the purchase management service provider EASI together with the payment service provider, the EASI service can be made available to all issuing banks in the whole world without the need for installations of an EAC database at each issuing bank. The service is globally scalable via the purchase management service provider EASI from day one, something the industry has not been able to provide prior to the EASI service.

With the EASI service may follow one global card, where the payment service provider adds the EASI service to its platform for their B2B offering, their corporate payments. Through CaaS-providers (Card as a Service), such as FIS Global, Marqeta, Nexi, and others, the EASI service can easily be added to existing cards, and with economy or administrative system providers such as SAP, Visma, Oracle, or Microsoft Dynamics, the EASI service can be added as on option also to their customer base.

Use Case

To further describe the invention, the following use case is provided. The purchasing entity Acompany comprises the subsections Service, Development, Sales and Administration. Acompany defines its purchasing policies and rules through a customer interface 120 to a central database arrangement 110, and orders payment cards for all its purchasing individuals from its bank. Some of the purchasing individuals have personal payment cards, while others have joint payment cards.

Acompany defines its subsection Service as the purchasing group Service, where the same purchasing rules apply to all personnel. Since the Service personnel in order to provide immediate service to faulty equipment must be able to travel extensively, and on short notice, all purchasing individuals within the purchasing group Service have personal payment cards, and the purchasing rules for the purchasing group Service have very few restrictions. Acompany however constantly follows up all purchases against the Service budget, and may adapt the purchasing rules over time due to budgetary constraints.

Acompany defines its subsection Development as the purchasing group Development, with much more restrictions. Development personnel comprise both Acompany employees and consultants. Development personnel are not allowed to make any purchase that has not been approved in advance by the Development manager. Some of the Development personnel have personal payment cards, but there are also a number of joint payment cards for the purchasing group Development.

Acompany defines its subsection Sales as two different purchasing groups, LocalSales and WorldwideSales. The purchasing group LocalSales do not normally travel abroad, and the purchasing rules can thus be restricted to purchases within the country. The purchasing group WorldwideSales on the other hand travel extensively, and may thus have much fewer restrictions in the purchasing rules. However, the purchasing rules may e.g. state that pre-approval is necessary if a hotel is selected which is not on the list of hotels and hotel chains for which Acompany has negotiated rates. All of the Sales personnel have personal payment cards.

Acompany defines its subsection Administration as the purchasing group Administration. Administration personnel must be able to make minor purchases such as office material and lunches, and the purchasing rules may thus be restricted e.g. on amounts and suppliers. The purchasing group Administration has a joint payment card.

When a Service employee attempts to make a purchase with the payment card, the merchant bank sends a transaction authorization request via the payment card network, e.g. comprising the transaction authorization information shown in FIG. 7. The transaction authorization module 405 receives the transaction authorization request and performs a number of checks, e.g. regarding card data, account balance, limits and behavior. If the transaction authorization module 405 decides to approve the transaction based on these checks, it sends a purchase approval request to a purchasing authorization database 130, where transaction IDs are stored with metadata linked to them.

Since the Service employees all have the same purchasing rules, the purchasing authorization database 130 may assign the purchase to the next available transaction ID in the database that has been tagged for the purchasing group Service. That the purchase relates to the purchasing group Service may in this case be determined e.g. using the payment card number. However, a specific transaction ID may instead already have been selected by the Service employee, who may already have added metadata linked to this transaction ID. The purchasing rules for Service personnel are stored as metadata linked to the transaction ID, so the purchasing authorization database 130 decides on the purchase approval request by approving or rejecting it based on whether the requested purchase fulfils the Service purchasing rules. Since there are very few restrictions in the Service purchasing rules, most purchases are allowed. The purchasing authorization database 130 stores the transaction information as metadata linked to the transaction ID, and transfers this metadata to central database arrangement 110. The central database arrangement 110 then transfers the transaction information to Acompany, so that the information about the purchase may be automatically entered into economy and other administrative systems at Acompany.

When Development personnel make purchases, a similar flow is followed. However, since Development personnel are not allowed to make any purchase that has not been approved in advance by the Development manager, pre-approval of the purchase is necessary. A Development personnel that wishes to make a purchase uses the designated interface for purchasing groups 250 (e.g. a web interface or a mobile application) to obtain a transaction ID, and enters the required metadata relating to this purchase to the central database arrangement 110 through the interface. An action is then set for the Development manager to pre-approve this purchase. This may simply be an action defined in the system, but a reminder may also be automatically sent to the manager via e.g. SMS or email. Once the Development manager has approved the purchase, the purchasing rules will allow it.

When Sales personnel make purchases, a similar flow is also followed. As for Service personnel, the purchasing group WorldwideSales has very few restrictions. However, it may be desirable to change the purchasing rules for an individual or group of individuals within WorldwideSales, if it e.g. turns out that representation has become a bit too extravagant. A new purchasing group with more restrictions on e.g. cost for representation may then be defined, so that the previous purchasing group WorldwideSales becomes e.g. the two groups WorldwideSalesStandard and WorldwideSalesRestricted.

When Administration personnel make purchases, a similar flow is also followed. However, Administration personnel have much stricter purchasing rules, with restrictions e.g. on allowable suppliers/merchants. The transaction information sent from the transaction authorization module 405 comprises also merchant information, e.g. the name of the merchant or a code for identifying the merchant category and/or the merchant, and therefore the purchasing authorization database 130 may compare the merchant information with the allowable merchants and/or merchant categories according to the purchasing rules. Administration personnel may be restricted to certain suppliers/merchants such as e.g. ICA and/or Coop, or to certain merchant types such as e.g. food stores. For example, the Mastercard merchant category classification uses the MCC code 5661 for "Shoe Stores", and the VISA merchant category classification uses the MCC code 5499 for "Misc. Food Stores—Convenience Stores and Specialty Markets". This code is included in the Merchant Identification Code in the transaction authorization information. When Administration personnel purchase food in a food store, many different VAT levels may apply to different kinds of goods. The different VAT levels for the different items in the purchase may then be automatically stored as metadata linked to the transaction ID, to simplify administration within the purchasing entity 200.

Method Embodiments

Figure 8:
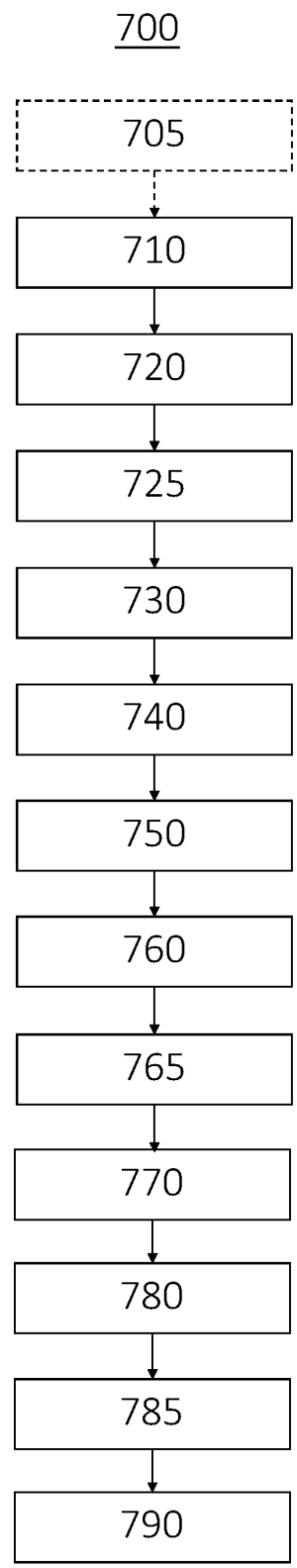
FIG. 8 schematically illustrates a purchase management method in accordance with embodiments described herein.

FIG. 8 schematically illustrates a purchase management method 700, in accordance with one or more embodiments described herein. The method 700 may comprise:

Step 710: inputting, through a customer interface 120 to a central database arrangement 110 comprising data fields for linking metadata to transaction IDs, purchasing rules applying to a purchasing group 250.

Step 720: adding a selected purchasing group 250 as metadata linked to a first transaction ID in one or more first data fields in the central database arrangement 110.

Step 725: adding the purchasing rules applying to the purchasing group 250 as metadata linked to the first transaction ID in one or more second data fields in the central database arrangement 110.

Step 730: transferring metadata linked to the first transaction ID from the data fields in the central database arrangement 110 to a purchasing authorization database module 130.

Step 740: receiving, in a transaction authorization module 405, a first transaction authorization request linked to the first transaction ID, the first transaction authorization request comprising transaction authorization information.

Step 750: communicating a purchase approval request from the transaction authorization module 405 to the purchasing authorization database module 130, which purchase approval request has been generated in the transaction authorization module 405 based on information received via a payment card network, and comprises transaction information, comprising at least the purchase amount.

Step 760: deciding on the purchase approval request by approving or rejecting the purchase approval request based on whether the requested purchase fulfils the purchasing rules linked to the first transaction ID in the purchasing authorization database module 130.

Step 765: responding to the transaction authorization module 405 with the approval or rejection of the purchase approval request.

Step 770: responding, from the transaction authorization module 405, to the first transaction authorization request linked to the first transaction ID.

Step 780: adding the transaction information received from the transaction authorization module 405 as metadata linked to the first transaction ID in the purchasing authorization database module 130.

Step 785: transferring the transaction information linked to the first transaction ID to the central database arrangement 110.

Step 790: transferring the transaction information linked to the first transaction ID to the purchasing entity 200, thereby allowing the information about the purchase to be automatically entered into at least one administrative system of the purchasing entity 200.

According to the invention, the payment card number identifies the payment service provider, and also identifies to the payment card network and/or the payment service provider that the payment card is a part of the purchase management system. It is therefore the payment card number that automatically triggers the generation of the purchase approval request, and thereby allows a "hardblock" of the purchase directly at the time of purchase based on purchasing rules defined by the purchasing entity.

In embodiments, the purchasing authorization database module 130 is arranged within the cardholder bank 500, as a bank specific database module 130. This enables quick response times for the purchase approval request, and also allows the type of transaction information that it for regulatory reasons is not allowed to send outside the firewall of the bank to be added as metadata linked to the first transaction ID in the purchasing authorization database module 130. There are sometimes strict regulatory requirements on the transaction information that it is allowed to receive from the outside and/or send outside of the bank, but by arranging the purchasing authorization database 130 module within the bank, also transaction information that it is not allowed to receive from the outside and/or send outside of the bank may be entered into the purchasing authorization database module 130. However, the purchasing authorization database module may also be arranged to be separate from the bank, especially if the transaction information is encrypted.

The purchasing authorization database module does not have to be operated by an actual bank—it may be operated by any type of payment service provider (such as e.g. Apple, Google, Klarna, PayPal, Amazon or Alibaba) or transaction provider (such as e.g. FIS Global or Nexi).

In embodiments, the transaction authorization module 405 is operated by a payment provider 400 operating a payment card network (such as e.g. MasterCard, VISA or American Express), and thus arranged within the payment card network. Since the payment provider 400 operates the payment card network, the payment provider 400 has access to all the transaction information that is transferred within the payment card network. If the transaction authorization module 405 is operated by a payment provider 400 operating a payment card network, the checks that are typically made by the payment provider 400 (regarding e.g. card data, limits and behavior) may be performed in the transaction authorization module 405, without even contacting the cardholder bank 500.

In embodiments, the purchasing authorization module 130 is also operated by the payment provider 400, possibly together with the provider of the central database arrangement 110. However, the purchasing authorization module 130 may alternatively be operated by a third party, and communicate directly with the transaction authorization module 405 in the payment card network. In either case, the purchasing authorization based on the purchasing rules may if desirable be performed between the transaction authorization module 405 and the purchasing authorization module 130, without even contacting the cardholder bank 500. In this case, the cardholder bank 500 is not contacted until all checks except the final check against the account balance have been performed. However, it is also possible to perform the check against the account balance at the cardholder bank 500 before performing the purchasing authorization based on the purchasing rules in the purchasing authorization module 130.

In embodiments, the data fields in the central database arrangement 110 are configurable, and the inputting 710 comprises inputting also a configuration of a data format for the metadata for each data field defined for the purchasing group 250.

In embodiments, the purchasing group 250 comprises at least one purchasing individual. This enables purchasing rules to be defined for and adapted to one or more specific purchasing individuals, or for subsections of the purchasing entity comprising one or more purchasing individuals.

In embodiments, the purchasing group 250 comprises the whole purchasing entity 200. This enables the purchasing entity to define general purchasing rules for the whole entity.

In embodiments, the purchasing rules are general purchasing rules for a subsection of the purchasing entity 200, and the adding 725 of the purchasing rules applying to the purchasing group 250 as metadata linked to the first transaction ID in the central database arrangement 110 involves determining to which subsection the purchasing group 250 belongs.

In embodiments, the transaction information comprises merchant information, such as e.g. the name of the merchant or a code for identifying the merchant category and/or the merchant, and the deciding 760 on the purchase approval request by approving or rejecting it is further based on the merchant information. This enables the purchasing entity 200 to block purchases from selected suppliers/merchants and/or merchant categories and/or only allow purchases from selected suppliers/merchants and/or merchant categories. The purchasing entity 200 may also block purchases in a certain city, region, country, currency or similar, and/or only allow purchases in a certain city, region, country, currency or similar.

In embodiments, the purchasing rules specify that certain metadata must have been added linked to the transaction ID in the central database arrangement 110 before a purchase is made, and the deciding 760 on the purchase approval request comprises rejecting the purchase approval request if this metadata is not present linked to the transaction ID in the purchasing authorization database module 130.

In embodiments, the transferring 730 of metadata linked to the first transaction ID from the central database arrangement 110 to the purchasing authorization database module 130, and the transferring 785 of the transaction information linked to the first transaction ID to the central database arrangement 110, comprise synchronizing the central database arrangement 110 and the purchasing authorization database module 130 to be mirrored versions of each other.

In embodiments, the central database arrangement 110 is arranged to communicate with a number of different parties 200, 250, 300, 500, 600, 150 and comprises adapters 205, 255, 305, 505, 605, 155 that convert the data format used by each of these different parties into one single data format, preferably a data format defined by the purchasing entity 200.

The method 700 may further comprise:

Step 705: transferring information from the central database arrangement 110 to a payment card issuing entity 600, either directly or via a payment card administration module 510 which may be arranged within the cardholder bank 500, so that the payment card issuing entity 600 may issue payment cards to the purchasing entity 200.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. In this disclosure, an embodiment of the invention using payment cards has been described. However, the term "payment card" in this application covers all payment means that are used for payments via a payment card network such as e.g. MasterCard, VISA or American Express. This includes physical payment cards, electronic payment cards, virtual payment cards, smartphones or other devices also when used for payment services such as e.g. Apple Pay, Google Pay, Samsung Pay, including using e.g. QR, EAN or PIN codes. Further, the described embodiments use a purchasing authorization database module 130 that is separate from the central database arrangement 110, but the purchasing authorization database module 130 may instead be embodied within the central database arrangement 110, so that the transaction authorization module 405 interacts directly with the central database arrangement 110. Accordingly, the scope of the invention is defined only by the claims.

Further, not all of the steps of the claims have to be carried out in the listed order. For example, the purchasing rules do not have to be inputted into the central database arrangement 110 before the creation of a transaction ID. Further, if the purchasing entity 200 amends the purchasing rules and enters new purchasing rules into the central database arrangement 110, the metadata related to the purchasing rules that is linked to a transaction ID in the central database arrangement 110 may be updated and transferred to the purchasing authorization database module 130 until a purchase approval request has been approved or rejected for the transaction ID. In another example, the transaction information may be added as metadata linked to the transaction ID either before or after the approval/rejection of the purchase approval request. All technically meaningful orders of the steps are covered by the claims.

The invention claimed is:

1. Purchase management system comprising a central database arrangement, a customer interface to the central database arrangement comprising data fields for linking metadata to transaction IDs, and a purchasing authorization database module, arranged to communicate with a transaction authorization module,
   wherein data fields in the central database arrangement are dynamically set by a purchasing entity in order to define metadata desired by the purchasing entity and data format for the metadata,
   wherein the central database arrangement is arranged to receive, from the purchasing entity through the customer interface, purchasing rules applying to a purchasing group, and comprises central processing means arranged to:
   add a selected purchasing group as metadata linked to the first transaction ID in one or more first data fields in the central database arrangement;
   add the purchasing rules applying to said purchasing group as metadata linked to the first transaction ID in one or more second data fields in the central database arrangement; and
   transfer metadata linked to the first transaction ID from the data fields to the purchasing authorization database module;
   wherein the purchasing authorization database module is arranged to receive a purchase approval request from the transaction authorization module, which purchase approval request has been generated in the transaction authorization module based on information received via a payment card network, and comprises transaction information, comprising at least the purchase amount, linked to the first transaction ID, where the purchasing authorization database module comprises authorization processing means arranged to:
   decide on the purchase approval request by approving or rejecting the purchase approval request based on whether the requested purchase fulfils the purchasing rules linked to the first transaction ID in the purchasing authorization database module;
   respond to the transaction authorization module with the approval or rejection of the purchase approval request;
   add the transaction information received from the transaction authorization module as metadata linked to the first transaction ID in the purchasing authorization database module; and transfer the transaction information linked to the first transaction ID to the central database arrangement; and wherein the central processing means of the central database arrangement are further arranged to transfer the transaction information linked to the first transaction ID to the purchasing entity, thereby allowing the information about the purchase to be automatically entered into at least one administrative system of the purchasing entity.

2. The system according to claim 1, wherein the transaction authorization module is operated by a payment provider operating the payment card network, and thus arranged within the payment card network.

3. The system according to claim 1, wherein the data fields in the central database arrangement are configurable, and the central database arrangement is arranged to receive, from the purchasing entity, a configuration of a data format for the metadata for each data field defined for the purchasing group.

4. The system according to claim 1, wherein the purchasing rules are purchasing rules applying to a purchasing group comprising at least one purchasing individual.

5. The system according to claim 1, wherein the purchasing rules are purchasing rules applying to a purchasing group comprising the whole purchasing entity.

6. The system according to claim 1, wherein the purchasing rules are general purchasing rules for a subsection of the purchasing entity, and the central processing means of the central database arrangement are arranged to add the purchasing rules applying to the purchasing group as metadata linked to the first transaction ID in the central database arrangement based on determining to which subsection the purchasing group belongs.

7. The system according to claim 1, wherein the transaction information comprises merchant information, and wherein the authorization processing means of the purchasing authorization database module are arranged to decide on the purchase approval request by approving or rejecting the purchase approval request further based on the merchant information.

8. The system according to claim 1, wherein the purchasing rules specify that certain metadata must have been added linked to the transaction ID in the central database arrangement before a purchase is made, and wherein the authorization processing means of the purchasing authorization database module are arranged to reject the purchase approval request if this metadata is not present linked to the transaction ID in the purchasing authorization database module.

9. The system according to claim 1, wherein the central processing means of the central database arrangement are further arranged to transfer information, either directly or via a payment card administration module, to a payment card issuing entity that issues payment cards to the purchasing entity.

10. The system according to claim 1, wherein the system is arranged so that the central database arrangement and the purchasing authorization database module are synchronized to be mirrored versions of each other.

11. The system according to claim 1, wherein the central database arrangement is arranged to communicate with a number of different parties, and comprises adapters that convert the data format used by each of these different parties into one single data format defined by the purchasing entity.

12. Purchase management method, comprising:

inputting, through a customer interface to a central database arrangement comprising data fields for linking metadata to transaction IDs, purchasing rules applying to a purchasing group;

dynamically setting, by a purchasing entity, data fields in the central database arrangement in order to define metadata desired by the purchasing entity and data format for the metadata;

adding a selected purchasing group as metadata linked to a first transaction ID in one or more first data fields in the central database arrangement;

adding the purchasing rules applying to said purchasing group as metadata linked to the first transaction ID in one or more second data fields in the central database arrangement;

transferring metadata linked to the first transaction ID from the data fields in the central database arrangement to a purchasing authorization database module;

receiving, in a transaction authorization module, a first transaction authorization request linked to the first transaction ID, the first transaction authorization request comprising transaction authorization information;

communicating a purchase approval request from the transaction authorization module to the purchasing authorization database module, which purchase approval request has been generated in the transaction authorization module based on information received via a payment card network, and comprises transaction information, comprising at least the purchase amount;

deciding on the purchase approval request by approving or rejecting the purchase approval request based on whether the requested purchase fulfils the purchasing rules linked to the first transaction ID in the purchasing authorization database module;

responding to the transaction authorization module with the approval or rejection of the purchase approval request;

responding, from the transaction authorization module, to the first transaction authorization request linked to the first transaction ID;

adding the transaction information received from the transaction authorization module as metadata linked to the first transaction ID in the purchasing authorization database module transferring the transaction information linked to the first transaction ID to the central database arrangement; and transferring the transaction information linked to the first transaction ID to the purchasing entity, thereby allowing the information about the purchase to be automatically entered into at least one administrative system of the purchasing entity.

13. The method according to claim 12, wherein the transaction authorization module is operated by a payment provider operating the payment card network, and thus arranged within the payment card network.

14. The method according to claim 12, wherein the data fields in the central database arrangement are configurable, and the inputting comprises inputting also a configuration of a data format for the metadata for each data field defined for the purchasing group.

15. The method according to claim 12, wherein the purchasing group comprises at least one purchasing individual.

16. The method according to claim 12, wherein the purchasing group comprises the whole purchasing entity.

17. The method according to claim 12, wherein the purchasing rules are general purchasing rules for a subsection of the purchasing entity, and the adding of the purchasing rules applying to the purchasing group as metadata linked to the first transaction ID in the central database arrangement involves determining to which subsection the purchasing group belongs.

18. The method according to claim 12, wherein the transaction information comprises merchant information, and wherein the deciding on the purchase approval request by approving or rejecting the purchase approval request is further based on the merchant information.

19. The method according to claim 12, wherein the purchasing rules specify that certain metadata must have been added linked to the transaction ID in the central database arrangement before a purchase is made, and wherein the deciding on the purchase approval request comprises rejecting the purchase approval request if this metadata is not present linked to the transaction ID in the purchasing authorization database module.

20. The method according to claim 12, further comprising transferring information from the central database arrangement to a payment card issuing entity either directly or via a payment card administration module, so that the payment card issuing entity may issue payment cards to the purchasing entity.

21. The method according to claim 12, wherein the transferring of metadata linked to the first transaction ID from the central database arrangement to the purchasing authorization database module, and the transferring of the transaction information linked to the first transaction ID to the central database arrangement, comprise synchronizing the central database arrangement and the purchasing authorization database module to be mirrored versions of each other.

22. The method according to claim 12, wherein the central database arrangement is arranged to communicate with a number of different parties, and comprises adapters that convert the data format used by each of these different parties into one single data format defined by the purchasing entity.

23. Purchase management system comprising a central database arrangement arranged to communicate with a transaction authorization module, and a customer interface to the central database arrangement comprising data fields for linking metadata to transaction IDs, wherein data fields in the central database arrangement are dynamically set by a purchasing entity in order to define metadata desired by the purchasing entity and data format for the metadata, wherein the central database arrangement is arranged to receive, from the purchasing entity through the customer interface, purchasing rules applying to a purchasing group, and comprises central processing means arranged to:

add a selected purchasing group as metadata linked to the first transaction ID in one or more first data fields in the central database arrangement; and add the purchasing rules applying to said purchasing group as metadata linked to the first transaction ID in one or more second data fields in the central database arrangement, wherein the central database arrangement is arranged to receive a purchase approval request from the transaction authorization module, which purchase approval request has been generated in the transaction authorization module based on information received via a payment card network, and comprises transaction information, comprising at least the purchase amount, linked to the first transaction ID, where the central database arrangement comprises authorization processing means arranged to:

decide on the purchase approval request by approving or rejecting the purchase approval request based on whether the requested purchase fulfils the purchasing rules linked to the first transaction ID in the central database arrangement;

respond to the transaction authorization module with the approval or rejection of the purchase approval request; and add the transaction information received from the transaction authorization module as metadata linked to the first transaction ID in the central database arrangement; and wherein the central processing means of the central database arrangement are further arranged to transfer the transaction information linked to the first transaction ID to the purchasing entity, thereby allowing the information about the purchase to be automatically entered into at least one administrative system of the purchasing entity.

* * * * *